United States Patent
Banba et al.

(10) Patent No.: US 12,168,222 B2
(45) Date of Patent: Dec. 17, 2024

(54) SYNTHESIS GAS PRODUCTION CATALYST STRUCTURE AND PRECURSOR THEREOF, SYNTHESIS GAS PRODUCTION APPARATUS, AND METHOD OF PRODUCING SYNTHESIS GAS PRODUCTION CATALYST STRUCTURE

(71) Applicant: FURUKAWA ELECTRIC CO., LTD., Tokyo (JP)

(72) Inventors: Yuichiro Banba, Tokyo (JP); Kaori Sekine, Tokyo (JP); Yukako Nakai, Tokyo (JP); Mai Nishii, Tokyo (JP); Masayuki Fukushima, Tokyo (JP); Sadahiro Kato, Tokyo (JP); Atsushi Shimoyamada, Tokyo (JP); Tomohiko Mori, Tokyo (JP); Takao Masuda, Sapporo (JP); Yuta Nakasaka, Sapporo (JP); Takuya Yoshikawa, Sapporo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 792 days.

(21) Appl. No.: 17/299,639

(22) PCT Filed: Dec. 3, 2019

(86) PCT No.: PCT/JP2019/047296
§ 371 (c)(1),
(2) Date: Feb. 10, 2022

(87) PCT Pub. No.: WO2020/116473
PCT Pub. Date: Jun. 11, 2020

(65) Prior Publication Data
US 2022/0161242 A1    May 26, 2022

(30) Foreign Application Priority Data

Dec. 3, 2018  (JP) .................. 2018-226934

(51) Int. Cl.
*B01J 29/76* (2006.01)
*B01J 35/40* (2024.01)
(Continued)

(52) U.S. Cl.
CPC ............... *B01J 29/76* (2013.01); *B01J 35/40* (2024.01); *B01J 35/56* (2024.01); *C01B 3/40* (2013.01); *C01B 2203/0238* (2013.01)

(58) Field of Classification Search
CPC .. B01J 29/035; B01J 29/0352; B01J 29/0354; B01J 29/0356; B01J 29/0358;
(Continued)

(56) References Cited

U.S. PATENT DOCUMENTS 5,275,720 A * 1/1994 Ward .................. C07C 5/41
208/46
11,161,101 B2 * 11/2021 Kato .................. B01J 37/10
(Continued)

FOREIGN PATENT DOCUMENTS

CN    103889577 A    6/2014
EP    3 632 544 A1    4/2020
(Continued)

OTHER PUBLICATIONS

Machine Translation of JP 2017-128480 A, Jul. 2017.*
(Continued)

*Primary Examiner* — Colin W. Slifka
(74) *Attorney, Agent, or Firm* — Oblon, McClelland, Maier & Neustadt, L.L.P.

(57) ABSTRACT

A synthesis gas production catalyst structure or the like which can maintain stable high catalytic activity for a long period of time without degradation and can allow efficient production of a synthesis gas including carbon monoxide and hydrogen. The synthesis gas production catalyst structure 1 for use in producing a synthesis gas comprising
(Continued)

carbon monoxide and hydrogen, the synthesis gas production catalyst structure 1 including: supports each having a porous structure and including a zeolite-type compound; and at least one catalytic material present in the support, in which each of the supports has channels communicating with one another, each of the supports has a ratio (L/d ratio) of long side dimension L to thickness dimension d of 5.0 or more, and the catalytic material is present at least in the channel of each of the supports.

17 Claims, 5 Drawing Sheets

(51) Int. Cl.
*B01J 35/56* (2024.01)
*C01B 3/40* (2006.01)

(58) Field of Classification Search
CPC ...... B01J 29/041; B01J 29/042; B01J 29/043; B01J 29/044; B01J 29/045; B01J 29/06; B01J 29/061; B01J 29/064; B01J 29/068; B01J 29/072; B01J 29/076; B01J 29/085; B01J 29/087; B01J 29/088; B01J 29/103; B01J 29/106; B01J 29/123; B01J 29/126; B01J 29/143; B01J 29/146; B01J 29/166; B01J 29/163; B01J 29/185; B01J 29/20; B01J 29/22; B01J 29/24; B01J 29/26; B01J 29/405; B01J 29/42; B01J 29/44; B01J 29/46; B01J 29/48; B01J 2229/14; B01J 2229/186; B01J 2229/18; B01J 35/00; B01J 35/04; B01J 35/1057; B01J 35/1061; B01J 35/109; B01J 35/0073
USPC .......................... 502/60, 73, 74, 77, 78, 79
See application file for complete search history.

(56) References Cited

U.S. PATENT DOCUMENTS

| | | | |
|---|---|---|---|
| 2011/0118425 A1 | 5/2011 | Nesterenko et al. | |
| 2014/0303266 A1 | 10/2014 | Hyman | |
| 2016/0137516 A1* | 5/2016 | Kegnæs | B01J 35/647 585/467 |
| 2017/0036197 A1 | 2/2017 | Kegnæs et al. | |
| 2017/0341063 A1* | 11/2017 | Otto | B01J 29/74 |
| 2019/0039056 A1 | 2/2019 | Kato et al. | |

FOREIGN PATENT DOCUMENTS

| | | | |
|---|---|---|---|
| JP | 2003-238147 A | | 8/2003 |
| JP | 2008-229587 A | | 10/2008 |
| JP | 2013-255911 A | | 12/2013 |
| JP | 2014-200705 A | | 10/2014 |
| JP | 2014-534902 A | | 12/2014 |
| JP | 2016-2527 A | | 1/2016 |
| JP | 2017-515785 A | | 6/2017 |
| JP | 2017-128480 A | | 7/2017 |
| JP | 2017-159247 A | | 9/2017 |
| WO | WO 2010/097108 A1 | | 9/2010 |
| WO | WO 2010/097224 | * | 9/2010 |
| WO | WO 2013/057319 | * | 4/2013 |
| WO | WO 2013/057319 A2 | | 4/2013 |
| WO | WO 2016/208728 A1 | | 12/2016 |
| WO | WO 2017/072698 A1 | | 5/2017 |
| WO | WO 2018/221697 A1 | | 12/2018 |

OTHER PUBLICATIONS

Liu et al. "cobalt nanoparticles imbedded into zeolite crystals : A tailor-made catalyst for one-step synthesis of gasoline from syngas", Internatonal Journal of Hydrogen Energy, 41, (2016), pp. 21965-21978.*

Alabahar et al., Microporous and Mesoporous Materials, 302 (2020), pp. 1-8.*

Xing et al., "Completed encapsulation of cobalt particles in mesoporous H-ZSM-5 zeolite catalyst for direct synthesis of middle isoparaffin from syngas", Catalysis Communications, 55, (2014) pp. 53-56.*

Extended European Search Report issued Aug. 1, 2022 in European Patent Application No. 19892246.0, citing reference 24 therein, 9 pages.

Laprune et al., "Highly Dispersed Nickel Particles Encapsulated in Multi-hollow Silicalite-1 Single Crystal Nanoboxes: Effects of Siliceous Deposits and Phosphorous Species on the Catalytic Performances", Chemcatchem, vol. 9, No. 12, 2017, pp. 2297-2307, XP055391961.

International Search report issued Mar. 3, 2020 in PCT/JP2019/047296 filed Dec. 3, 2019, citing documents AA-AC and AS-AU therein, 2 pages.

Combined Chinese Office Action and Search Report issued Mar. 10, 2023 in Patent Application No. 201980077934.6 (with English machine translation), citing documents 15-18 therein, 28 pages.

Notice of Reasons for Refusal issued Mar. 28, 2023 in Japanese Patent Application No. 2020-559940 (with English machine translation), 5 pages.

Office Action issued May 21, 2024, in corresponding Japanese Patent Application No. 2020-559940 (with English Translation), citing documents 15-17 therein, 5 pages.

* cited by examiner

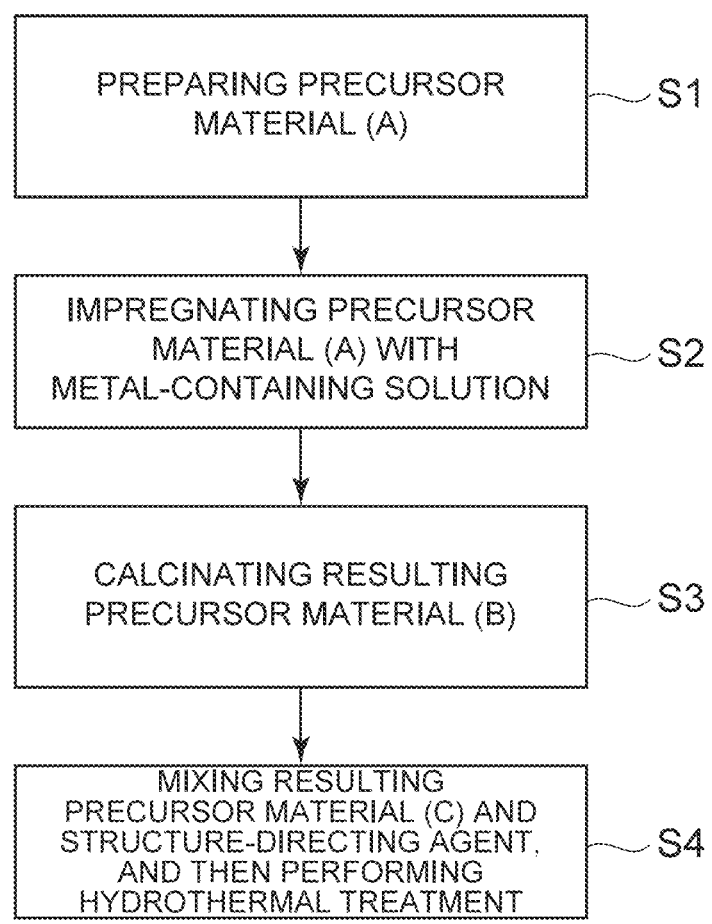

SYNTHESIS GAS PRODUCTION CATALYST STRUCTURE AND PRECURSOR THEREOF, SYNTHESIS GAS PRODUCTION APPARATUS, AND METHOD OF PRODUCING SYNTHESIS GAS PRODUCTION CATALYST STRUCTURE

TECHNICAL FIELD

The present invention relates to a catalyst structure for use in synthesis gas production, a precursor thereof, a synthesis gas production apparatus, and a method of producing a catalyst structure for use in synthesis gas production.

BACKGROUND ART

In recent years, to address the global warming, attention has been paid to a technology (dry reforming) that includes bringing carbon dioxide as a substance responsible for global warming into contact with methane to convert the carbon dioxide into a synthesis gas including carbon monoxide and hydrogen.

For example, Patent Document 1 discloses a catalyst for use in the production of such a synthesis gas, which includes a support of an oxygen-deficient perovskite complex oxide containing Mn and a certain alkaline earth metal, and nickel as a supported metal.

The reaction for producing the synthesis gas including the carbon monoxide and the hydrogen through contact between the carbon dioxide and the methane needs to be carried out at a temperature as high as 800° C. or more. Unfortunately, the catalyst disclosed in Patent Document 1, which includes the metal supported on the outer surface of the support, is vulnerable to degradation of the catalytic activity, which is caused by aggregation (sintering) of the supported metal particles at high temperature or by the carbon deposition (coking) on the catalyst at high temperature.

For example, Patent Document 2 discloses a method for preventing the adhesion between the catalyst particles and increasing the specific surface area of the catalyst particles, which includes fixing the catalyst particles on the surface of a base material and then performing the oxidation treatment and the reduction treatment under the specific conditions.

Patent Document 3 discloses a dry reforming catalyst including Ni supported on a complex oxide. The dry reforming can easily cause the coking on the surface of the catalyst and easily cause a decrease in the catalytic activity. This is because the carbon content in the raw material is higher in the drying reforming than in the steam reforming in which the methane is allowed to react with water vapor. The coking also leads to the problem of clogging of a catalytic bed in a reaction tube. In particular, the Ni-supported catalyst is vulnerable to coking and its catalytic activity is difficult to maintain, although the Ni-supported catalyst has the advantage of high catalytic activity.

For example, Patent Documents 4 and 5, although silent on the dry reforming, disclose a technique for forming a structure of the catalyst structure for maintaining the activity of the catalyst particles, which includes preparing the amorphous silica-coated metal fine particles using an emulsion technique, and hydrothermally treating the fine particles to incorporate the metal fine particles into the zeolite. The emulsion technique used to obtain the amorphous silica-coated metal fine particles includes mixing a surfactant and a metal source in an organic solvent to form an emulsion, adding a reducing agent to the emulsion to form the metal fine particles, adding a silane coupling agent to the emulsion to form a silica layer on the surfaces of the metal fine particles; and then allowing the zeolite to grow from the silica layer.

Patent Document 1: Japanese Unexamined Patent Application, Publication No. 2013-255911
Patent Document 2: Japanese Unexamined Patent Application, Publication No. 2016-2527
Patent Document 3: Japanese Unexamined Patent Application, Publication No. 2014-200705
Patent Document 4: Japanese Unexamined Patent Application, Publication No. 2017-128480
Patent Document 5: PCT International Publication No. WO2010/097108

DISCLOSURE OF THE INVENTION

Problems to be Solved by the Invention

Unfortunately, when the catalyst structure disclosed in Patent Document 2 having the catalyst particles fixed on the surface of the base material is placed in a high-temperature reaction field such as the dry reforming reaction, the catalyst structure will also suffer from aggregation of the catalyst particles and the coking to decrease an catalytic activity over the reaction time course. To recover the catalytic function of the catalyst structure, therefore, the oxidation treatment and the reduction treatment needs to be performed again, which requires a complicated operation. Also, for practical use, the catalytic activity of the catalyst structure should be further improved.

When the metal fine particles are produced using the emulsion technique as disclosed in Patent Document 4 or 5, the size of the resulting metal fine particles is affected by the size of the droplets formed during the emulsion forming process and by the tendency of the metal particles to aggregate. In general, the base metals are vulnerable to aggregation and can hardly remain in a nanoparticle size. According to Patent Documents 5 and 6, the particles of only Rh, Au, Pt, and Pd are observed to be nanosized among noble metals. On the other hand, Patent Documents 5 and 6 are silent on whether the meta fine particles of Ru, a base metal which is vulnerable to aggregation, or oxides thereof can be nanosized when they are incorporated in the zeolite. In the emulsion technique, the organic solvent and the surfactant used during the formation of the zeolite structure can remain as impurities, which can easily have an adverse effect on the thermal stability of the zeolite. Patent Document 4 is also silent on zeolite containing fine particles of a base metal such as which is vulnerable to the coking. It is also considered that, in the process of Patent Document 5 similar to that of Patent Document 4, the organic solvent or the surfactant cannot be completely removed and the remaining residue may degrade the durability of the catalyst against the high temperature reaction such as the dry reforming reaction.

It is an object of the present invention to provide a synthesis gas production catalyst structure, which can maintain stable high catalytic activity for a long period of time without degradation and can allow efficient production of a synthesis gas including carbon monoxide and hydrogen, and to provide a precursor of the catalyst structure, a synthesis gas production apparatus including the catalyst structure or the precursor, and a method of producing the synthesis gas production catalyst structure.

Means for Solving the Problems

Specifically, the present invention has the following principal features.

1. A synthesis gas production catalyst structure for use in producing a synthesis gas including carbon monoxide and hydrogen, the synthesis gas production catalyst structure including: supports each having a porous structure and including a zeolite-type compound; and at least one catalytic material present in the supports, wherein each of the supports has channels communicating with one another, each of the supports has a ratio (L/d ratio) of long side dimension L to thickness dimension d of 5.0 or more, and the catalytic material is present at least in the channel of each of the supports.
2. The synthesis gas production catalyst structure according to aspect 1, wherein the L/d ratio of the supports is 5.0 or more and 35.0 or less.
3. The synthesis gas production catalyst structure according to aspect 1 or 2, wherein the t/d ratio of the supports is 7.0 or more and 25.0 or less.
4. A synthesis gas production catalyst structure for use in producing a synthesis gas including carbon monoxide and hydrogen, the synthesis gas production catalyst structure including: supports each having a porous structure and including a zeolite-type compound; and at least one catalytic material present in the supports, wherein each of the supports has channels communicating with one another, each of the supports has a ratio (L/d ratio) of long side dimension L to thickness dimension d of 5.0 or more, and the catalytic material is present at least in the channel of each of the supports, and has an average particle size of 1.00 nm or more and 13.00 nm, or less.
5. The synthesis gas production catalyst structure according to any one of aspects 1 to 4, wherein the catalytic material has an average particle size larger than an average inner diameter of the channels.
6. The synthesis gas production catalyst structure according to any one of aspects 1 to 5, wherein the channels have any one of a one-dimensional pore, a two-dimensional pore, and a three-dimensional pore of a framework structure of the zeolite-type compound, and have an enlarged pore portion different from the one-dimensional pore, the two-dimensional pore, and the three-dimensional pore, and the catalytic material is present at least in the enlarged pore portion.
7. The synthesis gas production catalyst structure according to aspect 6, wherein the enlarged pore portion connects a plurality of pores constituting any one of the one-dimensional pore, the two-dimensional pore, and the three-dimensional pore.
8. The synthesis gas production catalyst structure according to aspect 6 or 7, wherein the catalytic material has an average particle size equal to or smaller than an inner diameter of the enlarged pore portion.
9. The synthesis gas production catalyst structure according to any one of aspects 1 to 8, wherein the catalytic material is in the form of a metal fine particle.
10. The synthesis gas production catalyst structure according to aspect 9, wherein a ratio ($D_C/D_F$) of an average particle size $D_C$ of the metal fine particle to an average inner diameter $D_F$ of the channels is 0.05 or more and 130.0 or less.
11. The synthesis Gas production catalyst structure according to aspect 9 or 10, wherein the metal fine particle is a fine particle including at least one metal selected from the group consisting of iron (Fe), cobalt (Co), and nickel (Ni).
12. The synthesis gas production catalyst structure according to any one of aspects 9 to 11, wherein the metal fine particle is a fine particle including nickel (Ni).
13. The synthesis gas production catalyst structure according to any one of aspects 1 to 8, wherein the catalytic material is in the form of a metal oxide fine particle.
14. The synthesis Gas production catalyst structure according to any one of aspects 1 to 13, further including at least one additional catalytic material held on an outer surface of the support.
15. The synthesis gas production catalyst structure according to aspect 14, wherein the content of at least one catalytic material present in the support is higher than the content of the at least one additional catalytic material held on the outer surface of the support.
16. The synthesis gas production catalyst structure according to any one of aspects 1 to 15, wherein the zeolite-type compound is a silicate compound.
17. The synthesis gas production catalyst structure according to any one of aspects 1 to 16, wherein a $CH_4$ conversion rate at 700° C. is 20% or more when a dry reforming reaction is performed by charging the synthesis gas production catalyst structure in an atmospheric, pressure flow reactor, supplying a raw material gas with a $CO_2/CH_4$ ratio (volume ratio) of 1:1 at a gas hourly space velocity (GHSV) of 5600 $h^{-1}$ to the reactor, and heating under conditions that the synthesis gas production catalyst structure is heated at 100° C. for 10 minutes and then is heated to 900° C. at 20° C./minute and a total time of heating at 100° C. or higher is 60 minutes.
10. The synthesis gas production catalyst structure according to aspect 17, wherein the $CH_4$ conversion rate at 700° C. of the dry reforming reaction is 60% or more.
19. The synthesis gas production catalyst structure according to aspect 17 or 18, wherein a coke content of the synthesis gas production catalyst structure measured by CHN analysis after the dry reforming reaction with respect to a total mass of the synthesis gas production catalyst structure is less than 5.0 mass %.
20. The synthesis gas production catalyst structure according to any one of aspects 17 to 19, wherein a coke content of the synthesis gas production catalyst structure measured by CHN analysis after the dry reforming reaction with respect to a total mass of the synthesis gas production catalyst structure is less than 0.3 mass %.
21. A precursor of a synthesis gas production catalyst structure, including a precursor of the synthesis gas production catalyst structure according to any one of claims 1 to 20, wherein a precursor of the catalytic material is a metal oxide fine particle.
22. A synthesis gas production apparatus including the synthesis gas production catalyst structure according to any one of claims 1 to 20 or the precursor of the synthesis gas production catalyst structure according to claim 21.
23. A method of producing a synthesis gas production catalyst structure, the method including: a calcination step for calcining a precursor material (B) including a metal-containing solution and a precursor material for forming a support having a porous structure and including a zeolite-type compound, the precursor material (A) having pores with a pore size of 13.0 nm or less, and the precursor material (A) being impregnated with the metal-containing solution; and a hydrothermal treatment step for hydrothermally treating a precursor material (C) obtained by calcining the precursor material (B) to obtain a catalyst structure including a support having a ratio (L/d ratio) of long side dimension L to thickness dimension d of 5.0 or more.
24. The method of producing the synthesis gas production catalyst structure according to aspect 23, further including adding 50 mass % or more and 500 mass % or less of a nonionic surfactant to the precursor material (A) before the calcination step.

25. The method of producing the synthesis gas production catalyst structure according to aspect 23 or 24, wherein the metal-containinq solution is added in multiple portions to the precursor material (A) to impregnate the metal-containing solution into the precursor material (A).

26. The method of producing the synthesis gas production catalyst structure according to any one of aspects 23 to 25, wherein an addition amount of the metal-containing solution to the precursor material (A) is adjusted so as to adjust a ratio (Si/M atomic ratio) of the number of silicon (Si) constituting the precursor material (A) to the number of a metal element (M) contained in the metal-containing solution to 10 or more and 1000 or less when the precursor material (A) is impregnated with the metal-containing solution before the calcination step.

27. The method of producing the synthesis gas production catalyst structure according to any one of aspects 23 to 26, wherein the precursor material (C) and a structure-directing agent are mixed in the hydrothermal treatment step.

28. The method of producing the synthesis gas production catalyst structure according to any one of aspects 23 to 26, wherein the hydrothermal treatment step is performed in a basic atmosphere.

29. The method of producing the synthesis gas production catalyst structure according to any one of aspects 23 to 28, further including a step for subjecting the hydrothermally treated precursor material (C) to a reduction treatment in a reducing gas atmosphere.

Effects of the invention

The present invention makes it possible to provide a catalyst structure for use in a synthesis gas production, which can maintain stable high catalytic activity for a long period of time without degradation and can allow efficient production of a synthesis gas including carbon monoxide and hydrogen, and to provide a precursor of the catalyst structure, a synthesis gas production apparatus including the catalyst structure or the precursor, and a method of producing the catalyst structure for use in a synthesis gas production.

BRIEF DESCRIPTION OF THE DRAWINGS

FIGS. 1(a) and 1(b) are views schematically showing the inner structure of a synthesis gas production catalyst structure according to an embodiment, in which FIG. 1(a) is a perspective view (shown partially in transverse cross-sectional view), and FIG. 1(b) is a partially enlarged cross sectional view.

FIGS. 3(a) and 3(b) are partially enlarged cross-sectional views for illustrating an example of the function of the synthesis gas production catalyst structure shown in FIGS. 1(a) and 1(b), in which FIG. 3(a) is a view for illustrating a sieving function, and FIG. 3(b) is a view for illustrating a catalytic function.

FIG. 4 is a flowchart showing an example of a method of producing the synthesis gas production catalyst structure of FIGS. 1(a) and 1(b).

PREFERRED MODE FOR CARRYING OUT THE INVENTION

Hereinafter, embodiments will be described in detail regarding the drawings.

As a result of intensive studies for achieving the object, the inventors have found a synthesis gas production catalyst structure including: supports that have a porous structure and include a zeolite-type compound, and have a ratio (L/d ratio) of the long side dimension L to the thickness dimension d of 5.0 or more; and at least one catalytic material present in the supports, in which each of the supports has channels communicating with one another, and the catalytic material is present at least in the channel of each of the supports, and have completed the present invention based on the findings that such a synthesis gas production catalyst structure can maintain stable high catalytic activity for a long period of time without degradation and can allow efficient production of a synthesis gas including carbon monoxide and hydrogen.

A synthesis gas production catalyst structure according to an embodiment is a catalyst structure for use in producing a synthesis gas including carbon monoxide and hydrogen, including: supports each having a porous structure and including a zeolite-type compound; and at least one catalytic material present in the supports, in which each of the supports has channels communicating with one another, each of the supports has a ratio (L/d ratio) of long side dimension L to thickness dimension d of 5.0 or more, and the catalytic material is present at least in the channel of each of the supports.

A method of producing a synthesis gas production catalyst structure according to an embodiment includes: a calcination step for calcining a precursor material (B) including a metal-containing solution and a precursor material (A) for forming a support having a porous structure and including a zeolite-type compound, the precursor material (A) having pores with a pore size of 13.0 nm or less, and the precursor material (A) being impregnated with the metal-containing solution; and a hydrothermal treatment step for hydrothermally treating a precursor material (C) obtained by calcining the precursor material (B) to obtain a catalyst structure including a support having a ratio (L/d ratio) of long side dimension L to thickness dimension d of 5.0 or more.

Configuration of Catalyst Structure

Figure 1A:
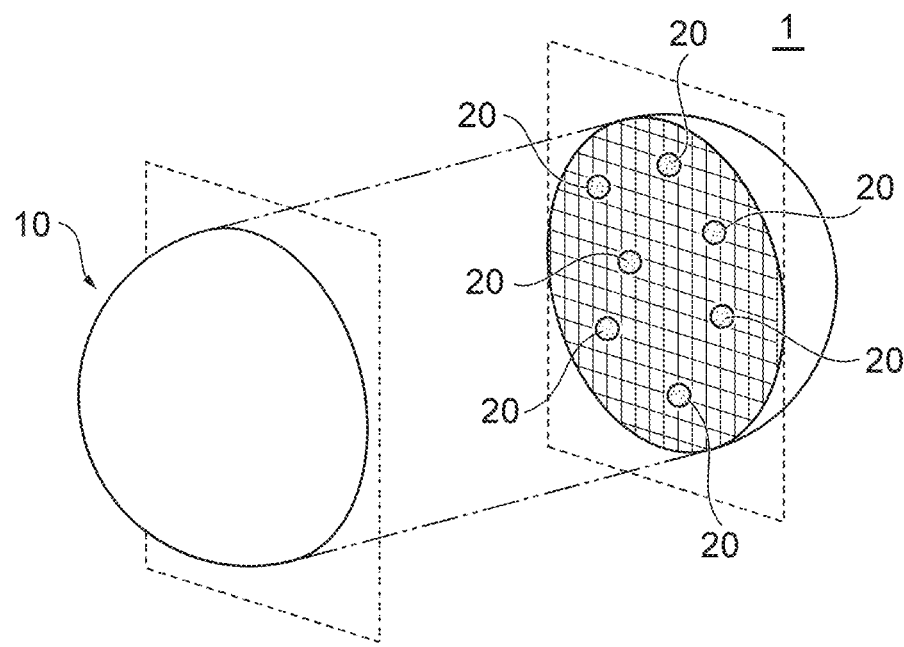
Figure 1B:
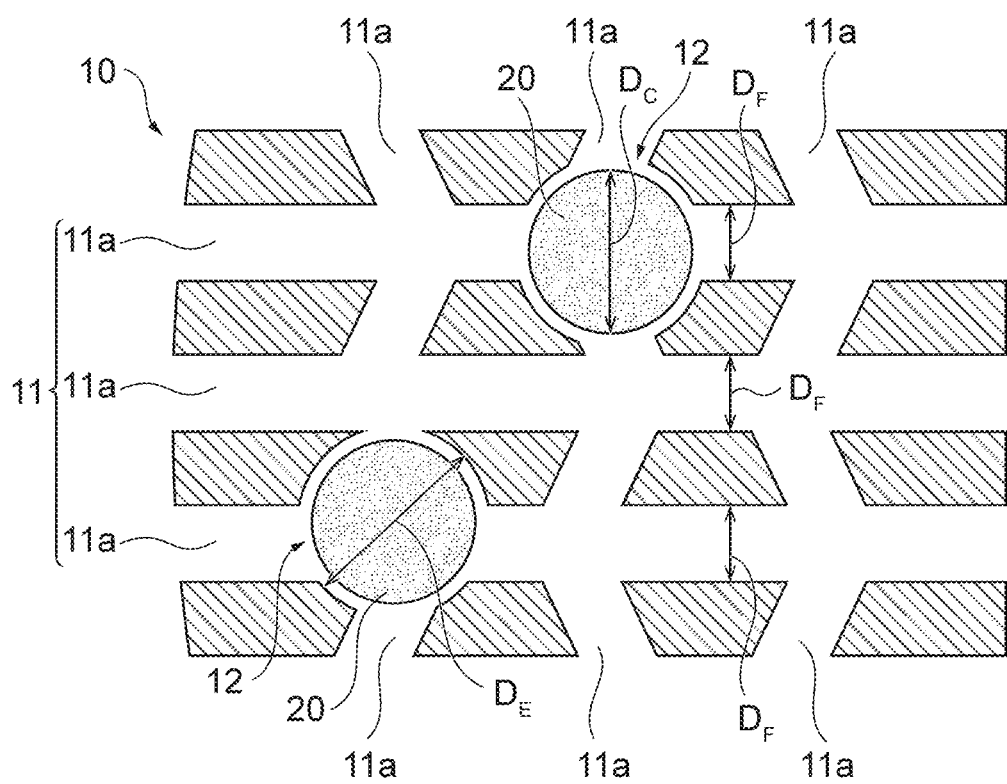

FIGS. 1(a) and 1(b) are views schematically showing the configuration of a synthesis gas production catalyst structure according to an embodiment (hereinafter also simply referred to as "catalyst structure"), in which FIG. 1(a) is a perspective view (shown partially in transverse cross-sectional view), and FIG. 1(b) is a partially enlarged cross-sectional view. It should be noted that FIGS. 1(a) and 1(b) show only an example of the catalyst structure, and the configuration shown in FIGS. 1(a) and 1(b) such as shapes or dimensions are non intended to limit those of the embodiment.

The catalyst structure 1 shown in FIG. 1(a) is a synthesis gas production catalyst structure for use in producing a synthesis gas including carbon monoxide and hydrogen, which includes supports 10 each having a porous structure and including a zeolite-type compound, and at least one catalytic material 20 present in the supports 10.

Support

The support 10 has a porous structure and includes a zeolite-type compound. As used herein, the term "zeolite-type compound" is intended to include not only crystalline aluminosilicates but also a variety of zeolite analog materials having a structure similar to that of the aluminosilicates, such as phosphate-based porous crystals, as shown in Shinji Inagaki, "New Development of Zeolite Chemistry", R&D Review of Toyota CRDL, Vol. 29, No. 2, June 1994, pp. 11-22. Examples of the zeolite-type compound include silicate compounds such as zeolite (aluminosilicate), cation-exchanged zeolite and silicalite, zeolite analogue compounds such as aluminoborate, aluminoarsenate and germanate, and phosphate-based zeolite analogue materials such as molybdenum phosphate. Among them, the zeolite-type compound is preferably a silicate compound.

The framework structure of the zeolite-type compound may be selected from FAU type (Y type or X type), MTW type, MFI type (ZSM-5), FER type (ferrierite), LTA type (A type), MWW type (MCM-22), MOR type (mordenite), LTL type (L type), BEA type (beta type), and so on, and is preferably MFI type and more preferably MFI type silicalite. The zeolite-type compound has multiple pores with a diameter (size) depending on the framework structure. For example, an MFI-type zeolite compound has a maximum pore size of 0.636 nm (6.36 Å) and an average pore size of 0.560 nm (5.60 Å).

The support 10 has a porous structure, and as shown in FIG. 1(b), preferably has multiple pores 11a, 11a, . . . and channels 11 communicating with one another. The catalytic material 20 is present at least in the channel 11 of the support 10 and is preferably held at least in the channel 11 of the support 10.

Such a configuration restricts the movement of the catalytic material 20 in the support 10 and effectively prevents aggregation of the catalytic materials 20, 20. This results in an increase in the sintering resistance of the catalyst structure 1, results in effective prevention of a decrease in the effective surface area of the catalytic material 20, and results in long-term retention of the catalytic activity of the catalytic material 20. In other words, the catalyst structure 1 makes it possible to prevent a decrease in the catalytic activity caused by aggregation of the catalytic materials 20, and to prolong the life of the catalyst structure 1. Moreover, due to the prolonged life of the catalyst structure 1, the frequency of replacement of the catalyst structure 1 can be reduced, and the amount of discarding of the used catalyst structure 1 can be greatly reduced, which leads to resource-saving.

In general, when the catalyst structure is used in a fluid, the catalyst structure may receive an external force from the fluid. In such a case, if the catalytic material is deposited on only the outer surface of the support 10, there will be a problem in that, due to the influence of the external force from the fluid, the catalytic material can easily separate from the outer surface of the support 10. On the other hand, in the catalyst structure 1 according to this embodiment, the catalytic material 20 is held at least in the channel 11 of the support 10 and thus less likely to separate from the support 10 even when receiving the external force from the fluid.

Specifically, when the catalyst structure 1 is placed in the fluid, the fluid flowing into the channels 11 through the pores 11a of the support 10 encounters flow channel resistance (frictional force), so that the velocity of the fluid flowing in the channel 11 would be lower than that of the fluid flowing on the outer surface of the support 10. Due to the influence of such flow channel resistance, the pressure applied from the fluid onto the catalytic material 20 held in the channel 11 becomes lower than that applied from the fluid onto the catalytic material held outside the support 10. Therefore, the catalytic material 20 present in the support 10 is effectively prevented from separating from the support 10, and the catalytic activity of the catalytic material 20 can be stably maintained for a long period of time. The flow channel resistance would be higher when the channel 11 of the support 10 has multiple curves or branches and the interior of the support 10 has a more complicated three-dimensional structure.

The channels 11 preferably have any one of a one-dimensional pore, a two-dimensional pore, and a three-dimensional pore, which are defined by the framework structure of the zeolite-type compound, and preferably have an enlarged pore portion 12 different from the one-dimensional pore, the two-dimensional pore, and the three-dimensional pore. In this case, the catalytic material 20 is preferably present at least in the enlarged pore portion 12 and more preferably included at least in the enlarged pore portion 12. According to this configuration, the movement of the catalytic material 20 is further restricted in the support 10, and separation of the catalytic material 20 and aggregation of the catalytic material 20, 20 are more effectively prevented. The state in which the catalytic material 20 is included in the porous structure of the support 10 indicates that the catalytic material 20 is enclosed within the support 10. In this regard, the catalytic material 20 and the support 10 do not always have to be in direct contact with each other, and the catalytic material 20 may be indirectly held by the support 10 with an additional material (e.g., a surfactant) provided between the catalytic material 20 and the support 10.

As used herein, the term "one-dimensional pore" or "one-dimensional pores" refers to a tunnel-type or cage-type pore that forms a one-dimensional channel or refers to multiple tunnel-type or cage-type pores (multiple one-dimensional channels) that form multiple one-dimensional channels. The term "two-dimensional pore" refers to a two-dimensional channel in which multiple one-dimensional channels are connected two-dimensionally. The term "three-dimensional pore" refers to a three-dimensional channel in which multiple one-dimensional channels are connected three-dimensionally.

FIG. 1(b) shows a case in which the catalytic material 20 is included in the enlarged pore portion 12. Such a configuration is non-limiting, and alternatively, the catalytic material 20 may be present in the channel 11 while partially protruding from the enlarged pore portion 12. Alternatively, the catalytic material 20 may be partially embedded in a portion of the channel 11 other than the enlarged pore portion 12 (e.g., an inner wall portion of the channel 11) or may be held by fixation or the like.

The enlarged pore portion 12 preferably connects a plurality of pores 11a, 11a constituting any one of the one-dimensional pore, the two-dimensional pore, and the three-dimensional pore. According to the configuration, another channel different from the one-dimensional pore, the two-dimensional pore, or the three-dimensional pore is provided in the support 10 to exert the function of the catalytic material 20 more effectively.

The channel 11 preferably has a three-dimensional structure including a branching portion or a junction portion inside the support 10, and the enlarged pore portion 12 is preferably provided at the branching portion or the junction portion of the channel 11.

The average inner diameter $D_F$ of the channels 11 provided in the support 10 is calculated from the average of the short diameter and the long diameter of the pores 11a constituting any one of the one-dimensional pore, the two-dimensional pore, and the three-dimensional pore. The average inner diameter $D_F$ of the channels 11 is preferably 0.10 nm or more and 1.50 nm or less and more preferably 0.50 nm or more and 0.80 nm or less. The inner diameter $D_E$ of the enlarged pore portion 12 is preferably 0.5 nm or more and 13.0 nm or less, more preferably 1.1 nm or more and 13.0 nm or less, and even more preferably 1.1 nm or more and 3.3 nm or less. The inner diameter $D_E$ of the enlarged pore portion 12 depends, for example, on the pore size of the precursor material (A) described later and the average particle size $D_C$ of the catalytic material 20 to be included. The inner diameter $D_E$ of the enlarged pore portion 12 is such that it is possible to include the catalytic material 20.

The catalytic activity is improved by forming the support 10 in an appropriate shape and more specifically by allowing the support 10 to have a ratio (L/d ratio) of the long side dimension L to the thickness dimension d of 5.0 or more. The catalytic activity should be improved for the following two reasons. Basically, the catalyst structure 1 has the pores 11a at the faces with the long side dimension L, such as the upper face and the lower face ((010) face and (100) face) defining the long side dimension L, but has no pores at the face with the thickness dimension d, such as the specific face ((101) face) among the side faces defining the thickness dimension. Therefore, as the L/d ratio increases, the pore content relative to the total surface area of the catalyst structure (the ratio of the number of the pores to the total surface area of the catalyst structure) increases, which increases the probability that the reactive gas comes into contact with the region containing the pore 11a and increases the probability that the reactive as comes into contact with the catalytic material inside the catalyst structure 1. Moreover, as the L/d ratio increases, the density of the catalyst structure 1 filled in a catalytic bed of a reaction tube becomes less excessive, which allows the reactive gas to easily enter into the pores 11a and makes it easy to ensure the route for transporting the reactive gas to the catalytic material. The L/d ratio of the support is 5.0 or more, preferably 5.0 or more and 35.0 or less, and more preferably 7.0 or more and 25.0 or less. When the support 10 has the L/d ratio of 5.0 or more, the catalytic activity increases as shown above. The catalytic activity increases as the L/d ratio of the support 10 increases. When the lid ratio is 35.0 or less, the catalyst structure 1 with high activity can be produced at high yield. Thus, the catalyst structure 1 with the L/d ratio of 5.0 or more and 35.0 or less has the high activity and is produced with at high efficiency. Examples of the specific shape of the support include a plate shape and a coffin shape.

Figure 2:
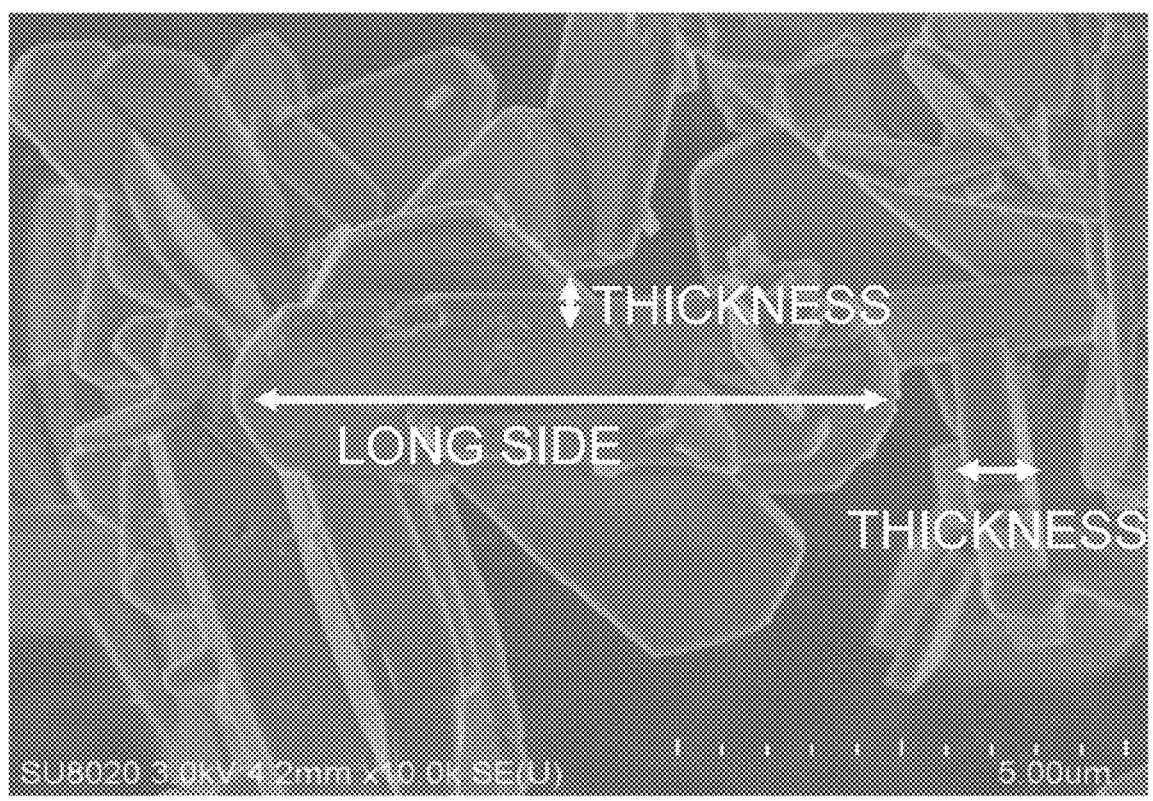
FIG. 2 is a scanning electron microscope (SEM) image showing the long side dimension and the thickness dimension of a support.

FIG. 2 is an image taken using a scanning electron microscope (SEM), which shows the long side dimension L and the thickness dimension d of the support 10. The long side dimension L of the support 10 is the length of the longest straight line drawn between any two points on the edge of the face of the support 10 viewed three-dimensionally. The thickness dimension d of the support 10 is the shortest distance between the face with the long side dimension of the support 10 and the face facing the face with the long side dimension. As shown in FIG. 2, the long side dimension L corresponds to the in-plane length of the upper face or the lower face of the support 10, and the thickness dimension d corresponds to the in-plane length of the side face of the support 10.

For example, any 200 pieces of the support 10 may be selected in an image taken with an SEM (SU8020 manufactured by Hitachi High Technologies Co., Ltd.) and each measured for the long side dimension L and the thickness dimension d. The L/d ratio may be determined from the measurements (N=200) of the average. The long side dimension L and the thickness dimension d may be determined as appropriate.

In general, during the course of the zeolite-type compound growth, a spherical zeolite-type compound with a certain particle size (L), for example a spherical zeolite-type compound grown to a particle size (L) of about 0.05 μm (the L/d ratio of about 1), will grow into a plate shape, a coffin shape, or the like, since the growth rate of such a spherical zeolite type compound is higher in the direction along a specific axis. In this process, the growth rate is much higher in the long side direction than in the thickness direction. Such a growth process of the zeolite-type compound may be also applied to the catalyst structure 1.

When the support 10 has a certain size, the support 10 can grow at a rate much higher in the long side direction than in the thickness direction as mentioned above, and when the support 10 has the long side dimension L of 1.00 μm or more, the support 10 can grow at a very low rate in the thickness direction. Therefore, the long side dimension L can correlate with the catalytic activity of the catalyst structure 1 as well as the L/d ratio. From this point of view, the long side dimension L is preferably 1.00 μm or more, more preferably 1.00 μm or more and 50.00 μm or less, and even more preferably 1.00 μm or more and 25.00 μm or less. When the long side dimension L is 1.00 μm or more, the catalyst structure 1 can have higher catalytic activity. The catalytic activity increases as the long side dimension L increases. When the long side dimension L is 50.00 μm or less, the catalyst structure with high activity 1 can be produced at high yield. Thus, the catalyst structure 1 with a long side dimension L of 1.00 μm or more and 50.0 μm or less has the high activity and is produced with at high efficiency. The thickness dimension d of the support 10 is preferably 0.05 μm or more and 2.00 μm or less.

Catalytic Material

Hereinafter, the catalytic material 20 will be described in detail. The catalytic material may be in the form of a metal fine particle including a single metal element, a mixture of two or more metal elements, or two or more metal elements that at least partially form an alloy. The catalytic material may also be in the form of a metal oxide fine particle including an oxide of at least one metal element or a composite thereof. The term "metal" used herein to indicate the component (material) of the catalytic material is a generic term for a metallic material including one or more metal elements, which is intended to include an elementary metal including a single metal element (M) and an alloy including two or more metal elements (M). The metal fine particles or the metal oxide fine particles may be held in the form of the primary particles in the channel 11 or held in the form of the secondary particles, which resulted from aggregation of the primary particles in the channels 11.

The metal fine particles only have to include metal which remains unoxidized. For example, the metal fine particles may include a single metal or a mixture of two or more metals. When used herein to indicate the component (material) of the metal fine particle, the term "metal" is a generic term for a metallic material including one or more metal elements, which is intended to include an elementary metal including a single metal element (M) and an alloy including two or more metal elements (M).

Examples of the metal element contained in the metal fine particle or the metal oxide tine particle include rhodium (Rh), ruthenium (Ru), iridium (Ir), palladium (Pd), platinum (Pt), molybdenum (Mo), tungsten (W), iron (Fe), cobalt (Co), chromium (Cr), cerium (Ce), copper (Cu), magnesium (Mg), aluminum (Al), and nickel (Ni). The metal fine particle and the metal oxide fine particle are preferably composed mainly of one or more of them.

Particularly in view of catalytic activity, the metal fine particle is preferably the fine particle including at least one metal selected from the group consisting of rhodium (Rh), ruthenium (Ru), iridium (Ir), palladium (Pd), platinum (Pt), iron (Fe), cobalt (Co), and nickel (Ni). In view of the scarcity and cost of them, the metal fine particle preferably include at least one metal selected from the group consisting of iron (Fe), cobalt (Co), and nickel (Ni).

In general, the carbon content in the raw material is higher in the dry reforming than in the steam reforming in which the methane is allowed to react with the water vapor, and thus the carbon deposition on the catalyst surface is more likely to occur in the dry reforming than in the steam reforming. Therefore, the dry reforming has the problem of the coking, which easily cause a decrease in the catalytic activity and cause the clogging of the catalytic bed in the reaction tube. Moreover, a need exists for the use of a non-noble metal catalyst since the noble metal catalysts (Pd, Rh, Ru, and Pt) are expensive. In particular, attention has been focused on the use of Fe, Co, and Ni, which are inexpensive and easily available. Among them, Ni, which is known to have the highest catalytic activity among them, is vulnerable to the coking. Fe and Co with catalytic activity lower than that of Ni are less in coking quantity, but the coking will occur on Fe and Co if the catalytic activity of Fe and Co is improved. Thus, a particularly strong need exists for the improvement of the coking resistance of the non-noble metal catalysts including Ni, as well as the improvement of the catalytic activity.

The coking can occur when a reactive material comes into contact with the metal fine particles and then migrates on the metal fine particles to undergo polymerization. The reactive material becomes more likely to undergo polymerization on the metal fine particles as the particle size increases, whereas the reactive material becomes less likely to undergo polymerization as the particle size decreases.

The coking can be sufficiently reduced if the metal fine particles successfully maintain their average particle size $D_C$ in a constant range, even when the metal fine particles are the fine particles including at least one metal selected from the group consisting of iron (Fe), cobalt (Co), and nickel (Ni), in particular, Ni fine particles having high catalytic activity.

The metal fine particle preferably has an average particle size $D_C$ of 1.00 nm or more and 13.00 nm or less as the constant range of the average particle size $D_C$. The metal fine particle having the average particle size $D_C$ within this range can have sufficiently increased catalytic activity and can increase in catalytic activity as the average particle size $D_C$ decreases. For both of the high catalytic activity and the high coking resistance, the metal fine particle preferably has the average particle size $D_C$ of 9.00 nm or less and more preferably 4.50 nm or less. When the metal fine particle is the fine particle including at least one metal selected from the group consisting of iron (Fe), cobalt (Co), and nickel (Ni), the metal fine particle having the average particle size $D_C$ within the above range can have a sufficiently increased level of the catalytic activity and the coking resistance.

The average particle size $D_C$ of the metal fine particle as the catalytic material 20 may be measured, for example, as follows. The cross-section of the catalyst structure 1 is measured by small angle X-ray scattering (SAXS) analysis. The resulting SAXS data are subjected to fitting by Guinier approximation using a spherical model to determine the average particle size $D_C$ of the metal fine particle and to obtain the dispersed state of the metal fine particles. The SAXS measurement may be carried out, for example, using the beamline BL19B2 of Spring-8.

The catalytic material 20 preferably has an average particle size $D_C$ larger than the average inner diameter $D_F$ of the channels 11 and equal to or smaller than the inner diameter $D_E$ of the enlarged pore portion 12 (namely $D_F<D_C\leq D_E$). The catalytic material 20 with such size is preferably included in the enlarged pore portion 12 in the channel 11, so that the movement of the catalytic material 20 is restricted in the support 10. Therefore, even when an external force is applied from a fluid to the catalytic material 20, the movement of the catalytic material 20 is suppressed in the support 10, so that the catalytic materials 20, 20 . . . respectively included in the enlarged pore portions 12 dispersed in the channels 11 of the support 10 are effectively prevented from coming into contact with one another.

The ratio ($D_C/D_F$) of the average particle size $D_C$ of the metal fine particles to the average inner diameter $D_F$ of the channels 11 is preferably 0.05 or more and 130.0 or less, more preferably 0.1 or more and 90.0 or less, even more preferably 1.1 or more and 45.0 or less, and further more preferably 1.4 or more and 6.3 or less.

When the catalytic material 20 is in the form of the metal fine particle, the content of the metal element (N) of the metal fine particles in the catalyst structure 1 is preferably 0.5 mass % or more and 7.6 mass % or less, more preferably 0.5 mass % or more and 6.9 mass % or less, and even more preferably 0.5 mass % or more and 2.5 mass % or less with respect to the mass of the structured catalyst 1. For example, when the metal element (M) is Ni, the content (mass %) of the Ni element is expressed by {(the mass of Ni element)/ (the mass of all elements in the catalyst structure 1)}×100.

The ratio (Si/M atomic ratio) of the number of silicon (Si) atoms in the support 10 to the number of the metal element (M) atoms in the metal fine particle is preferably 10 or more and 1000 or less and more preferably 50 or more and 200 or less. If the ratio is more than 1000, the effect of the catalytic material may not be a sufficient level, such as low catalytic activity. If the ratio is less than 10, the content of the catalytic material may be too high so that the strength of the support 10 may tend to reduce. It should be noted that, the metal fine particles 20 described herein are the fine particles present or carried inside the support 10 and are not intended to include the metal fine particles deposited on the outer surface of the support 10.

Function of Catalyst Structure

Figure 3A:
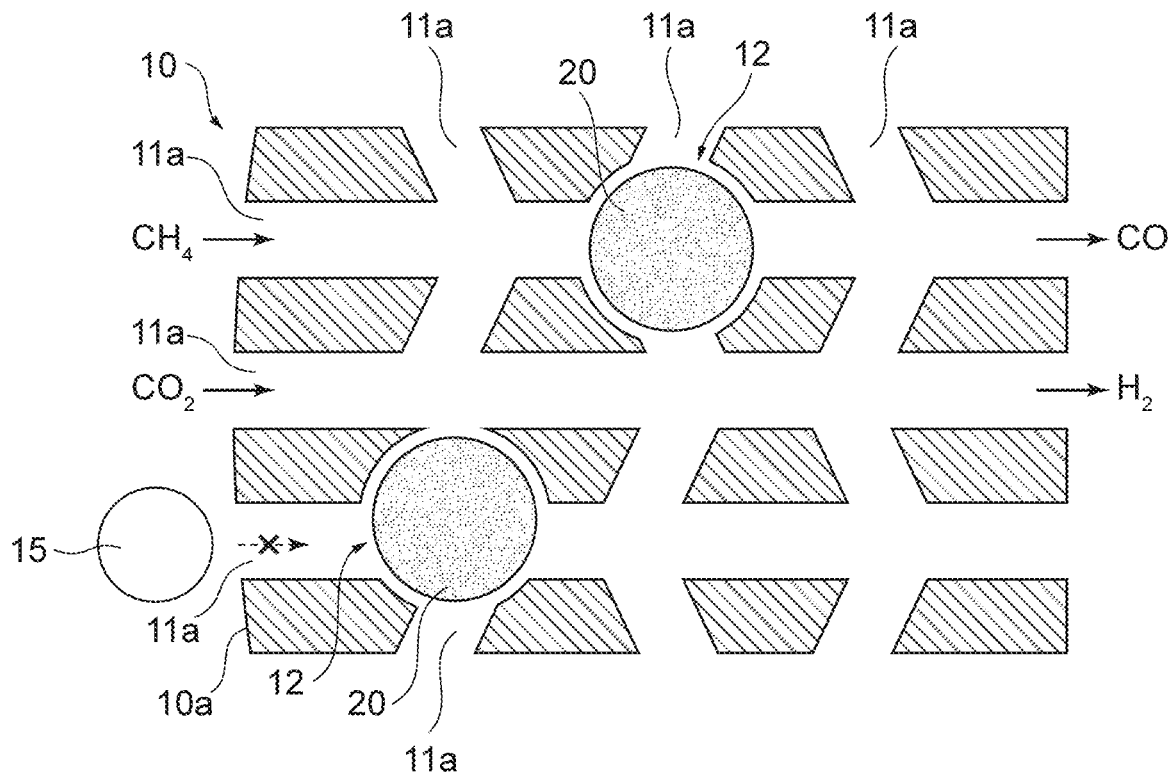
Figure 3B:
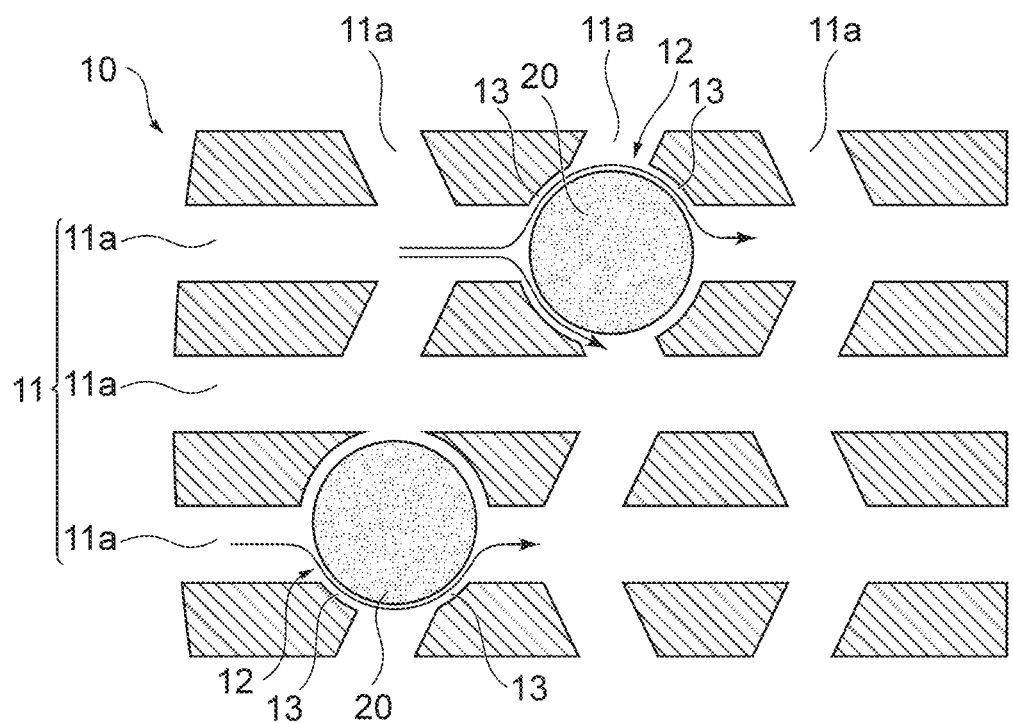

As mentioned above, the catalyst structure 1 includes a support 10 with a porous structure and at least one catalytic material 20 present in the support. When the catalytic material 20 present in the support 10 of the catalyst structure 1 is brought into contact with a fluid, the catalytic ability depending on the function of the catalytic material 20 is exhibited. Specifically, as shown in FIGS. 3(a) and 3(b), a fluid coming into contact with the outer surface 10a of the catalyst structure 1 is allowed to flow into the interior of the support 10 through a pore 11a formed at the outer surface 10a, then guided into the channels 11, and allowed to pass through the channels 11 and to flow out of the catalyst structure 1 through another pore 11a. When the catalytic material 20 held in the channel 11 comes into contact with the fluid passing through the channel 11, a catalytic reaction depending on the catalytic material 20 is caused. The catalyst structure 1 also has a molecular sieving ability since the support has a porous structure.

First, the molecular sieving ability of the catalyst structure 1 will be described with reference to FIG. 3(*a*) and an example in which the fluid includes a methane-containing gas and carbon dioxide. Herein, the methane-containing gas refers to a mixed gas including methane and a non-methane gas. The catalyst structure 1 may be brought into contact with the methane-containing gas and the carbon dioxide sequentially or simultaneously.

As shown in FIG. 3(*a*) a compound (e.g., methane or carbon dioxide) composed of molecule having size equal to or smaller than the diameter of the pore 11*a*, in other words, equal to or smaller than the inner diameter of the channel 11, can enter the support 10. On the other hand, a gas component 15 composed of molecule having size exceeding the diameter of the pore 11*a* cannot enter the support 10. Accordingly, among multiple compounds in the fluid, some compounds not capable of entering the support 10 are restricted from reacting, and some other compounds capable of entering the support 10 are allowed to react. In this embodiment, the reaction between methane and carbon dioxide proceeds.

Among compounds produced by reactions in the support 10, only compound composed of molecular having size equal to or smaller than the diameter of the pore 11*a* can exit through the pore 11*a* to the exterior of the support 10 to obtain as a reaction product. On the other hand, some compounds are not capable of exiting through the pore 11*a* to the exterior of the support 10. If such compounds are converted into compounds composed of molecule having size that allow exit to the exterior of the support 10, the compounds can exit to the exterior of the support 10. As a result, the use of the catalyst structure 1 makes it possible to selectively obtain a specific reaction product. In this embodiment, specifically, methane and carbon dioxide react to yield the synthesis gas as a reaction product including carbon monoxide and hydrogen.

In the catalyst structure 1, the catalytic material 20 is included in the enlarged pore portion 12 of the channel 11 as shown in FIG. 3(*b*). When the average particle size $D_C$ of the catalytic material 20 (metal fine particles) is larger than the average inner diameter $D_F$ of the channel 11 and smaller than the inner diameter $D_E$ of the enlarged pore portion 12 ($D_F < D_C < D_E$), a small channel 13 is provided between the catalytic material 20 and the enlarged pore portion 12. In this case, as indicated by the arrow in FIG. 3(*b*), the fluid entering the small channel 13 comes into contact with the catalytic material 20. Each of the catalytic material 20 included in the enlarged pore portion 12 is restricted from moving in the support 10. Thus, the catalytic materials 20 are prevented from aggregating in the support 10. As a result, a large contact area can be stably maintained between the catalytic material 20 and the fluid.

In this embodiment using the catalyst structure 1, the synthesis gas including the carbon monoxide and the hydrogen can be produced from the methane-containing gas and the carbon dioxide as the raw materials. The catalytic reaction, although carried out at a temperature of for example 800° C. or more, is less affected by the heating, since the catalytic material 20 is present in the support 10. As a result, a decrease in the catalytic activity is prevented, which allows the catalyst structure 1 to have a longer life.

As the catalytic activity of the catalyst structure 1, a $CH_4$ conversion rate at 700° C. is preferably 20% or more and more preferably 60% or more when a dry reforming reaction is performed by charging the catalyst structure in an atmospheric pressure flow reactor, supplying a raw material gas with a $CO_2/CH_4$ ratio (volume ratio) of 1:1 at a gas hourly space velocity (GHSV) of 5600 $h^{-1}$ to the reactor, and heating under conditions that the catalyst structure is heated at 100° C. for 10 minutes and then is heated to 900° C. at 20° C./minute and a total time of heating at 100° C. or higher is 60 minutes. The catalyst structure 1 with such a configuration has the high catalytic activity.

As the coking resistance of the catalyst structure 1, a coke content of the catalyst structure measured by CHN analysis after the dry reforming reaction with respect to a total mass of the catalyst structure is preferably less than 5.0 mass % and more preferably less than 0.3 mass %. The catalyst structure 1 with such high catalytic activity also has the high coking resistance.

Method of Producing Catalyst Structure

FIG. 4 is a flowchart showing a method of producing the catalyst structure 1 of FIGS. 1(*a*) and 1(*b*). Hereinafter, an example of the method for producing the catalyst structure containing the catalytic material 20 in the form of the metal fine particle present in the support will be described.

Step S1: Preparation Step

As shown in FIG. 4, first, a precursor material (A) is prepared, which is for obtaining a support having a porous structure and including a zeolite-type compound and has pores with a diameter (size) of 13.0 nm or less. The precursor material (A) is preferably a regular mesoporous material, and may be appropriately selected depending on the type (composition) of the zeolite-type compound constituting the support of the catalyst structure. When the pores of the precursor material (A) have a size of 13.0 nm or less, it will be easy to control the average particle size of the catalytic material, so that the high catalytic activity and the high coking resistance can be achieved. Thus, the pore size is 13.0 nm or less, preferably 10.0 nm or less, and more preferably 6.0 nm or less. As the pore size decreases, the catalytic activity and the coking resistance increases. For ease of the production and ease of the availability of the precursor material (A), the pores of the precursor material (A) preferably have the size of 0.7 nm or more and more preferably 1.0 nm or more.

When the zeolite-type compound constituting the support of the catalyst structure is a silicate compound, the regular mesoporous material is preferably a compound having a Si—O skeleton having pores with a pore size of 1.0 nm or more 13.0 nm or less uniformly and regularly developed one-dimensionally, two-dimensionally, or three-dimensionally. Such a regular mesoporous material is obtained as a variety of synthetic products depending on the synthesis conditions. Examples of such synthetic products include SBA-1, SBA-15, SBA-16, KIT-6, FSM-16, and MCM-41. In particular, MCC-41 is preferred.

For reference, SBA-1 has a pore size of 8.0 nm or more and 13.0 nm or less, SBA-15 has a pore size of 6.0 nm or more and 10.0 nm or less, SBA-16 has a pore size of 6.0 nm, KIT-6 has a pore size of 9.0 nm, FSM-16 has a pore size of 3.0 nm or more and 5.0 nm or less, and MCM-41 has a pore size of 1.0 nm or more and 10.0 nm or less. Examples of such a regular mesoporous material include mesoporous silica, mesoporous aluminosilicate, and mesoporous metallosilicate.

The precursor material (A) may be a commercially available product or a synthetic product. The precursor material (A) may be synthesized using a known method for synthesizing a regular mesoporous material. For example, a mixture solution which contains a raw material containing constituent element of the precursor material (A) and a casting agent for controlling the structure of the precursor material (A) is prepared, the pH of the mixture solution is optionally adjusted, and the mixture solution is subjected to hydrothermal treatment (hydrothermal synthesis). Subsequently, the precipitate (product) resulting from the hydrothermal treatment is collected (e.g., filtered off), washed and dried if necessary, and then calcinated to obtain a precursor material (A) as a powdery regular mesoporous material.

In this process, the solvent for the mixture solution may be, for example, water, an organic solvent such as alcohol, or a mixed solvent thereof. The raw material may be selected depending on the type of the support. Examples of the raw material include silica agents such as tetraethoxysilane (TEOS), fumed silica, and quartz sand. The casting agent may be any of various surfactants and block copolymers. Various types of surfactants, block copolymers, and the like can be used as the casting agent. The casting agent is preferably selected depending on the type of the regular mesoporous material to be synthesized. For example, MCM-41 is produced, a surfactant such as hexadecyltrimethylammonium bromide is preferable. The hydrothermal treatment may be performed, for example, in a sealed vessel under conditions at 80° C. or more and 800° C. or less and more than 0 kPa and 2000 kPa or less for 5 hours or more and 240 hours or less. The calcining treatment may be performed, for example, in the air under conditions at 350° C. or more and 850° C. or less for 2 hours or more and 30 hours or less.

Step S2: Impregnation Step

Next, the prepared precursor material (A) is impregnated with a metal-containing solution to form a precursor material (B).

The metal-containing solution may be any solution containing a metal component (e.g., metal ions) corresponding to the metal element (M) constituting the metal fine particle. For example, the metal-containing solution may be prepared by dissolving, in a solvent, a metal salt containing the metal element (M). Examples of such a metal salt include chlorides, hydroxides, oxides, sulfates, and nitrates, among which nitrates are preferred. The solvent may be, for example, water, an organic solvent such as alcohol, or a mixed solvent thereof.

Any method may be used to impregnate the precursor material (A) with the metal-containing solution. For example, before the calcination step described later, the impregnation is preferably performed by adding the metal-containing solution little by little in multiple portions to the powdery precursor material (A) being stirred. In order to allow the metal-containing solution to more easily enter into the pores of the precursor material (A), a surfactant is preferably added as an additive in advance before the addition of the metal-containing solution. Such an additive can act to cover the outer surface of the precursor material (A) and thus to inhibit the adhesion of the metal-containing solution on the outer surface of the precursor material (A), so that the metal-containing solution subsequently could easily enter into the pores of the precursor material (A).

Examples of such an additive include nonionic surfactants such as polyoxyethylene alkyl ethers, such as polyoxyethylene oleyl ether, and polyoxyethylene alkyl phenyl ether. These surfactants have a large molecular size and thus cannot enter into the pores of the precursor material (A), which suggests that the surfactants will not adhere to the interior of the pores and will not hinder the entering the metal-containing solution into the pores. A method of adding the nonionic surfactant preferably includes, for example, adding 50 mass % or more and 500 mass % or less of the nonionic surfactant to the precursor material (A) before the calcination step described later. This range is preferred since the suppressing effect can be exhibited at a proper level and an increase in viscosity can be kept at a proper level.

Preferably, the addition amount of the metal-containing solution added to the precursor material (A) is appropriately adjusted in view of the amount of the metal element (M) contained in the metal-containing solution with which the precursor material (A) is to be impregnated (in other words, the amount of the metal element (M) to be present in the precursor material (B)). For example, when the precursor material (A) is impregnated with the metal-containing solution before the calcination step described later, the addition amount of the metal-containing solution added to the precursor material (A) is preferably adjusted such that the ratio (Si/M atomic ratio) of the number of silicon (Si) atoms in the precursor material (A) to the number of the metal element (M) atoms contained in the metal-containing solution is set to 10 or more and 1000 or less and more preferably 50 or more and 200 or less. For example, when a surfactant is added as an additive to the precursor material (A) before the addition of the metal-containing solution to the precursor material (A) the addition amount of the metal-containing solution added to the precursor material (A) may be adjusted such that the calculated Si/M atomic ratio can be 50 or more and 200 or less. In such a case, the content of the metal element (M) of the metal fine particles can be adjusted to 0.5 mass % or more and 7.6 mass % or less based on the catalyst structure 1.

In the state of the precursor material (B), the content of the metal element (M) present within the porous is generally proportional to the addition amount of the metal-containing solution added to the precursor material (A) as long as the metal concentration of the metal-containing solution, the presence or absence of the additive, and other conditions such as temperature and pressure remain constant. The amount of the metal element (M) present in the precursor material (B) is also proportional to the amount of the metal element constituting the metal fine particles present in the support of the catalyst structure. Accordingly, when the addition amount of the metal-containing solution added to the precursor material (A) is controlled within the above range, the pores of the precursor material (A) can be sufficiently impregnated with the metal-containing solution, which makes it possible to adjust the content of the metal fine particles present in the support of the catalyst structure.

After the precursor material (A) is impregnated with the metal-containing solution, washing treatment may be performed if necessary. The washing liquid used may be water, an organic solvent such as alcohol, or a mixed solution thereof. Drying treatment is also preferably performed after the impregnation of the precursor material (A) with the metal-containing solution and then optionally after the washing treatment. The drying treatment may include natural drying overnight or so or drying at a high temperature of 150° C. or less. The drying is preferably performed thoroughly because the framework structure of the precursor material (A) as the regular mesoporous material may collapse if the calcination treatment described later is performed while a large amount of water contained in the metal-containing solution or in the washing liquid remains in the precursor material (A).

Step S3: Calcination Step

Next, the precursor material (B) is calcinated to form a precursor material (C). The precursor material (B) is a product obtained through impregnating, with the metal-containing solution, the precursor material (A) for forming the support having a porous structure and including the zeolite-type compound.

The calcining is preferably carried out, for example, in the air under conditions at a temperature in a predetermined range for 2 hours or more and 30 hours or less. The predetermined the temperature in the calcining is preferably 350° C. or more and 850° C. or less and more preferably 500° C. or more and 850° C. or less. Such calcination treatment allows the growth of crystals of the metal component entering into the pores for the regular mesoporous material, so that the metal fine particles are formed in the pores.

Step S4: Hydrothermal Treatment Step

Then, the precursor material (C) obtained through calcining the precursor material (B) is hydrothermally treated to form the catalyst structure. Preferably, in the hydrothermal treatment step, the precursor material (C) is hydrothermally treated by use of a mixture solution of the precursor material (C) and a structure-directing agent.

The structure-directing agent is a casting agent for directing the framework structure of the support of the catalyst structure. The structure-directing agent may be, for example, a surfactant. The structure-directing agent is preferably selected depending on the framework structure of the support of the catalyst structure, and preferred examples thereof include a surfactant such as tetramethylammonium bromide (TMABr), tetraethylammonium bromide (TEABr), tetrapropylammonium bromide (TPABr).

The precursor material (C) and the structure-directing agent may be mixed during or before the hydrothermal treatment step. Any method may be used to prepare the mixture solution. The precursor material (C), the structure-directing agent, and the solvent may be mixed at the same time, or the precursor material (C) and the structure-directing agent may be separately dispersed into individual solvents and then the resulting dispersion solutions may be mixed. The solvent may be, for example, water, an organic solvent such as alcohol, or a mixed solvent thereof. Before the hydrothermal treatment, the mixture solution is preferably subjected to pH adjustment using an acid or a base.

The hydrothermal treatment may be carried out using a known method, for example, which is preferably performed in a sealed vessel under conditions at 80° C. or more and 200° C. or less and more than 0 kPa and 2000 kPa or less for 5 hours or more and 100 hours or less. The hydrothermal treatment is also preferably performed in a basic atmosphere. Although the reaction mechanism is not necessarily clear, the hydrothermal treatment using the precursor material (C) as a raw material can gradually destroy the framework structure of the precursor material (C) as the regular mesoporous material but can form a new framework structure (porous structure) for the support of the catalyst structure due to the action of the structure-directing agent while the position of the metal fine particles in the pores of the precursor material (C) substantially remains. The resulting catalyst structure includes a support of a porous structure and metal fine particles present in the support, in which the support has channels connecting multiple pores derived from the porous structure, and at least some of the metal fine particles are located in the channel of the support.

In the embodiment of the hydrothermal treatment step, the mixture solution of the precursor material (C) and the structure-directing agent is prepared, and then the precursor material (C) is subjected to hydrothermal treatment. However, the hydrothermal treatment step is non-limited, the precursor material (C) may be hydrothermally treated without being mixed with the structure-directing agent and the precursor material (C).

The long side dimension L/thickness dimension d ratio (L/d ratio) of the support can be adjusted by the hydrothermal treatment step. The desired long side dimension L/thickness dimension d ratio can be obtained by selecting an appropriate degree of basicity, an appropriate treatment temperature, an appropriate treatment time, and/or an appropriate treatment pressure. For example, the hydrothermal treatment may be carried out using at least one of treatment conditions including the increase of the degree of basicity, the increase of the treatment temperature, the extension of the treatment time, and the addition of the pressure, so that the shape of the support can be controlled in such a way that the support grows first in the long side direction and then in the thickness diction. Preferably, the precipitate (catalyst structure) resulting from the hydrothermal treatment is collected (e.g., filtered off) and then optionally washed, dried, and calcinated. The washing liquid may be water, an organic solvent such as an alcohol, or a mixed solution thereof. The drying may include natural drying overnight or so or drying at a high temperature of 150° C. or less. The drying is preferably performed thoroughly because the framework structure of the catalyst structure as the support may collapse if the calcination treatment is performed while a large amount of water remains in the precipitate. The calcination treatment may be performed, for example, in the air under conditions at 350° C. or more and 850° C. or less for 2 hours or more and 30 hours or less. During such calcination treatment, the structure-directing agent is burned away from the catalyst structure. Depending on the intended use, the catalyst structure may be used as it is without undergoing the calcination treatment of the collected precipitate. For example, when the catalyst structure is used in a high-temperature oxidative atmosphere environment, the structure-directing agent will be burned away by exposing the catalyst structure to the usage environment for a certain period of time. In such a case, the resulting catalyst structure can be used without any modification since such a functional structure is substantially the same as that obtained after the calcination treatment.

The production method described above is an exemplary method for the case where an oxidation-resistant metal species (e.g., noble metal) is used as the metal element (M) contained in the metal-containing solution with which the precursor material (A) is to be impregnated.

An easily oxidizable metal species (e.g., Fe, Co, Ni) may also be used as the metal element (M) contained in the metal-containing solution with which the first precursor material is to be impregnated. In such a case, after the hydrothermal treatment, the hydrothermally treated precursor material (C) is preferably subjected to reduction treatment. When the metal-containing solution contains the easily oxidizable metal species as the metal element (M), the metal component can be oxidized by heating in the steps (step S3 and step S4) after the impregnation step (step S2). Accordingly, the support formed in the hydrothermal treatment step (step S4) may contain the metal oxide fine particles. In order to obtain the catalyst structure including the support containing the metal fine particles, therefore, the hydrothermal treatment is preferably followed by the calcination treatment of the collected precipitate and then preferably followed by the reduction treatment in a reducing as atmosphere such as hydrogen gas. The reduction treatment of the precipitate as a catalyst structure precursor reduces the metal oxide fine particles as a catalytic material precursor present in the support so that the fine particles of the metal element (M), namely, the metal fine particles are formed. As a result, the catalyst structure is obtained including the support containing the metal fine particles. It should be noted that such reduction treatment may be performed as needed. For example, if the catalyst structure is used in a reducing atmosphere environment, the metal oxide fine particles as a catalytic material precursor can be reduced by being exposed to the usage environment for a certain period of time. In such a case, the resulting catalyst structure can be used without such reduction treatment since the resulting catalyst structure is substantially the same as the catalyst structure obtained after the reduction treatment. A metal oxide may also remain in the catalytic material, and such a metal oxide corresponds to a precursor of the catalytic material.

Modifications of Catalyst Structure 1

Figure 5:
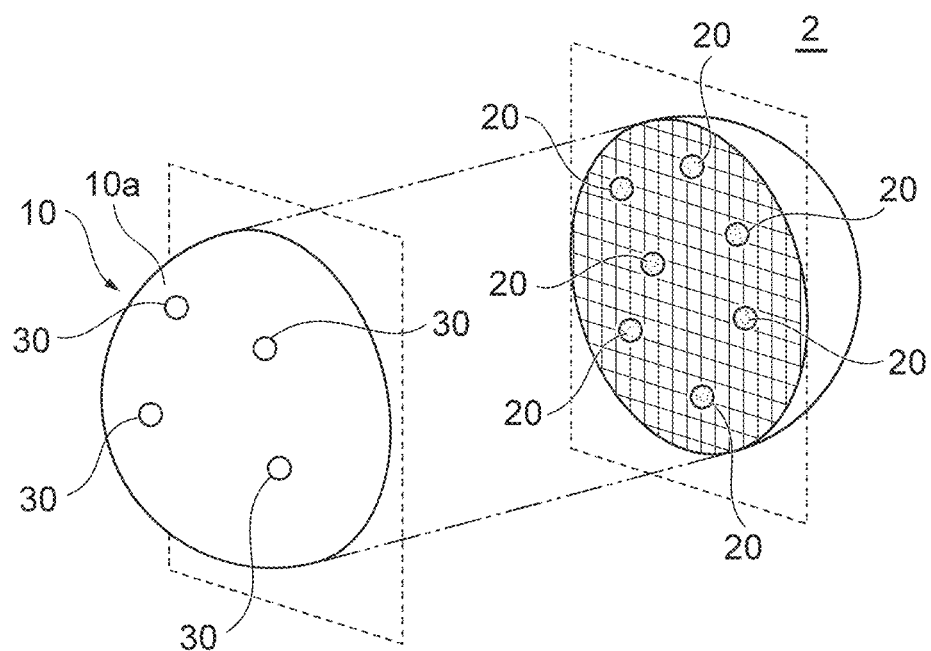
FIG. 5 is a schematic view showing a modification of the synthesis gas production catalyst structure of FIGS. 1(a) and 1(b).

FIG. 5 is a schematic view showing a modification of the catalyst structure 1 of FIGS. 1(a) and 1(b). The catalyst structure 1 shown in FIGS. 1(a) and 1(b) includes the support 10 and the catalytic material 20 present in the support 10. Such a structure is non-limiting, and, as shown in FIG. 5, for example, a catalyst structure 2 may further include an additional catalytic material 30 held on an outer surface 10a of the support 10.

The catalytic material 30 can perform one or more catalytic abilities. The catalytic ability of the additional catalytic material 30 may be the same as or different from that of the catalytic material 20. When both of the catalytic material 20 and 30 have the same catalytic ability, a material of the additional catalytic material 30 may be the same as or different from that of the catalytic material 20. According to the configuration, the content of the catalytic material held on the catalyst structure 2 can be increased, which further enhances the catalytic activity of the catalytic material.

In this case, the content of the catalytic material 20 present in the support 10 is preferably higher than the content of the additional catalytic material 30 held on the outer surface 10a of the support 10. In such a case, the catalytic ability of the catalytic material 20 held inside the support 10 can be dominant, and the catalytic ability of the catalytic material can be stably exhibited.

According to an embodiment, a synthesis gas production apparatus includes the catalyst structure 1 or 2 described above or the precursor of the catalyst structure 1 or 2. The synthesis gas production apparatus including the catalyst structure is suitable for use as an apparatus for producing the synthesis gas using the dry reforming, the steam reforming, the partial oxidation reaction, or the autothermal reforming. The synthesis gas production apparatus with such a configuration has the high coking resistance and the high catalytic activity due to the high sintering resistance and thus allows the long-term, stable production of the synthesis gas.

According to the embodiments described above, the catalyst structure is provided having both of the high catalytic activity and the high coking resistance. Such catalyst structure allows the long-term, efficient production of the synthesis gas.

While the embodiments have been described, it will be understood that the embodiments are not intended to limit the present invention and may be altered or modified in various ways based on the technical idea of the present invention.

EXAMPLES

Examples 1 to 22

Synthesis of Precursor Material (A)

An aqueous solution of a mixture of a silica agent (tetraethoxysilane (TEOS) manufactured by Wako Pure Chemical Industries, Ltd.) and a surfactant as a casting agent was prepared, then subjected to pH adjustment as needed, and then hydrothermally treated in a sealed vessel at 80° C. or more and 350° C. or less for 100 hours. Subsequently, the produced precipitate was filtered off, then washed with water and ethanol, and then calcinated in the air at 600° C. for 24 hours to obtain a precursor material (A) of the type and pore size shown in Table 1. The following surfactant was used according to the type of the precursor material (A) ("Type of precursor material (A): surfactant).

MCM-41: Hexadecyltrimethylammonium bromide (CTAB) (manufactured by Wako Pure Chemical Industries, Ltd.)

SBA-1: Pluronic P123 (manufactured by BASF Corporation)

Preparation of Precursor Materials (B) and (C)

Next, nickel nitrate (II) hexahydrate (manufactured by Wako Pure Chemical Industries, Ltd.) was dissolved in water to form a Ni-containing aqueous solution.

Subsequently, the Ni-containing aqueous solution was added little by little in multiple portions to the powdery precursor material (A), and the resulting product was then dried at room temperature (20° C.±10° C.) for at least 12 hours to obtain the precursor material (B).

Before the addition of the Ni-containing aqueous solution, a pretreatment was performed in which an aqueous solution of polyoxyethylene (15) oleyl ether (NIKKOL BO-15V, manufactured by Nikko Chemicals Co., Ltd.) as an additive was added to the precursor material (A). The Ni-containing aqueous solution was then added as described above to the pretreated precursor material (A).

The addition amount of the Ni-containing aqueous solution added to the precursor material (A) was adjusted such that the calculated ratio (Si/M atomic ratio) of the silicon (SI) content of the precursor material (A) to the Ni element (M) content of the Ni-containing aqueous solution was 100.

Subsequently, the resulting precursor material (B) impregnated with the Ni-containing aqueous solution was calcinated in the air at 600° C. for 24 hours to obtain the precursor material (C).

An aqueous solution of a mixture of the resulting precursor material (C) and tetrapropylammonium bromide (TPABr) as the structure-directing agent was prepared and then hydrothermally treated in a sealed vessel under the pH and time conditions shown in Table 1. Subsequently, the produced precipitate was filtered off, then washed with water, then dried at 100° C. for at least 12 hours, and then calcinated in the air at 600° C. for 24 hours. In Examples 1 to 22, after the calcination treatment, the calcinated product was collected and then subjected to the reduction treatment under the hydrogen gas stream at 700° C. for 90 minutes to obtain the catalyst structure including the support and the metal fine particle (Ni fine particle) as shown in Table 2. The pH shown in Table 1 was measured when the produced precipitate was filtered off.

COMPARATIVE EXAMPLE 1

In Comparative Example 1, alumina (manufactured by Wako) was impregnated with a nickel nitrate aqueous solution and then calcinated at 800° C. for 2 hours (in the air atmosphere) to form a 1 mass % Ni/$Al_2O_3$ catalyst structure in which 1 mass % of the Ni fine particle were held on the outer surface of the $Al_2O_3$ support.

COMPARATIVE EXAMPLE 2

In Comparative Example 2, a commercially available 66 mass % Ni/$Al_2O_3$—$SiO_2$ catalyst structure (manufactured by Alfa Aesar) was used, in which 66 mass % of Ni fine particle were held on the outer surface of the $Al_2O_3$—$SiO_2$ support.

COMPARATIVE EXAMPLE 3

In Comparative Example 3, the catalyst structure shown in Table 2 was obtained using the materials and conditions shown in Table 1.

Evaluation

The catalyst structures of Examples 1 to 22 and Comparative Examples 1 to 2 were evaluated for the various characteristics under the conditions shown below.

(A) Cross-Sectional Observation

Samples for observation were prepared by pulverization treatment from the catalyst structures of Examples 1 to 22 and Comparative Examples 1 to 3. The cross-section of each sample was observed using a transmission electron microscope (TEM) (TITAN G2 manufactured by FET Company). As a result, in all of the catalyst structures of Examples 1 to 22 and the catalyst structure of Comparative Example 3, the catalytic material was found to be present and held inside the support composed of silicalite. On the other hand, in the catalysts of Comparative Examples 1 and 2, the metal fine particles were found to be deposited only on the outer surface of the support and not found present in the support.

The catalyst structures of Examples 1 to 22 and Comparative Example 3 were subjected to cross-section cutting by use of focused ion beam (FIB) processing. The resulting cross-section was subjected to elemental analysis by use of SEM (SU8020 manufactured by Hitachi High Technologies Co., Ltd.) and energy dispersive X-ray spectroscopy (EDX) (X-Max manufactured by Horiba, Ltd.). As a result, Ni element was detected from the inside of the support. The results of the cross-sectional observation by use of TEM and SEM/EDX revealed the existence of the nickel fine particles inside the support of all the catalyst structures of Examples 1 to 22.

(B) Average Inner Diameter of Channels of Support and Average Particle Size of Catalytic Material Any 500 channels of the support were selected in the TEM image taken during the cross-sectional observation performed for the above evaluation (A). The long diameter and the short diameter of each of the channels were measured. The measured values were averaged to calculate the inner diameter of each channel (N=500), and the calculated inner diameters were averaged as the average inner diameter $D_F$ of the channels of the support.

Small angle X-ray scattering (SAXS) analysis was also performed to confirm the average particle size and the dispersed state of the catalytic material. The SAXS measurement was carried out using the beamline BL19B2 of Spring-8. The resulting SAXS data were subjected to fitting by Guinier approximation method using a spherical model to determine the particle size. As a result, it was found that the catalyst structure of each of Examples 1 to 22 contained the metal fine particles (Ni fine particles) with an average particle size in the range of 1.44 nm or more and 8.00 nm or less and that the particles of the catalytic material had sizes within a narrow range and were extremely highly dispersed in the support.

(C) Evaluation of Support Size

The size of the support was evaluated by use of the SEMI (SU8020 manufactured by Hitachi High Technologies Co., Ltd.). Any 200 support particles were selected and each measured for the long side dimension L and the thickness dimension d. The average of the long side dimension L/thickness dimension d ratio (L/d ratio) was calculated from the measurements (N=200).

For example, the long side dimension and the thickness dimension were as follows: the long side dimension was 2.29 μm and the thickness dimension was 0.37 μm in Example 3, the long side dimension was 3.76 μm and the thickness dimension was 0.52 μm in Example 4, the long side dimension was 10.16 μm and the thickness dimension was 0.98 μm in Example 5, the long side dimension was 11.97 μm and the thickness dimension was 0.69 μm in Example 6, the long side dimension was 19.30 μm and the thickness dimension was 0.58 μm in Example 7, and the long side dimension was 16.54 μm and the thickness dimension was 0.78 μm in Example 9. Although the long side dimension and the thickness dimension are shown above only for Examples 3 to 7 and 9, all of the examples including Examples 3 to 7 and 9 provided the long side dimension L of 1.00 μm or more and 25.00 μm or less and the thickness dimension d of 0.05 μm or more and 1.00 μm or less. On the other hand, the catalyst structure of Comparative Example 3 had the ratio (L/d ratio) of the long side dimension L to the thickness dimension d of 1.0.

(C) Performance Evaluation

The catalyst structures of the examples and the comparative examples were evaluated for the catalytic ability of the catalytic material. Table 3 shows the results.

(1) Catalytic Activity

The catalytic activity for the dry reforming was evaluated. An atmospheric pressure flow reactor was filled with 50 mg of the catalyst structure of each of Examples 1 to 22 and Comparative Examples 1 to 3. While $CO_2$ (5 ml/minute) and $CH_4$ (5 ml/minute) as raw material gases were supplied at GHSV 5,600 $h^{-1}$ to the reactor, the reactor was held at 100° C. for 10 minutes, then heated to 900° C. at 20° C./minute, and then held at 900° C. for 10 minutes such that the total time of the heating at least at 100° C. was 60 minutes. The used atmospheric pressure flow reactor was a single microreactor (Rx-3050SR available from Frontier Laboratory). The product was analyzed using gas chromatography-mass spectrometry (GC/MS).

The catalytic activity for the dry reforming was evaluated according to the following criteria regarding the $CH_4$ conversion rate at a temperature of 700° C. during the heating from 100° C. to 900° C.

The $CH_4$ conversion rate was 60% or more: ⊚

The $CH_4$ conversion rate was 40% or more and less than 60%: ○

The $CH_4$ conversion rate was 20% or more and less than 40%: Δ

The $CH_4$ conversion rate was less than 20%: ×

(2) Coking Resistance

After the evaluation of the catalytic activity (1), the amount of carbon (the amount of produced coke) deposited on each of the catalyst structures was analyzed using a CHN elemental analysis system (CE-440 (trade name) manufactured by Exeter Analytical, Inc.). The coking resistance was evaluated according to the following criteria regarding the amount of coke with respect to the total mass of the catalyst structure.

The amount of coke was less than 0.3 mass %: ⊚

The amount of coke was 0.3 mass % or more and less than 1.0 mass %: ○

The amount of coke was 1.0 mass % or more and less than 5.0 mass %: Δ

The amount of coke was more than 5.0 mass %: ×

The catalyst structure should have both of the good catalytic activity and the good coking resistance. Therefore, if one of the catalytic activity and the coking resistance is evaluated as low, the low evaluation is used as the comprehensive evaluation of the catalyst structure.

TABLE 1

| | Precursor material (A) | | Addition to precursor material (A) Calculated ratio (atomic ratio) for addition amount of Ni-containing aqueous solution Si/M | Conditions for hydrothermal treatment using precursor material © | | | |
|---|---|---|---|---|---|---|---|
| | Type | Pore size (nm) | | Type of structure-directing agent | Final pH | Temperature (°C.) | Time (h) |
| Example 1 | MCM-41 | 1.8 | 100 | TPABr | 10.0 | 150 | 72 |
| Example 2 | | 2.7 | | | 11.8 | | |
| Example 3 | | 2.7 | | | 11.5 | | |
| Example 4 | | 2.7 | | | 11.3 | | |
| Example 5 | | 2.7 | | | 11.0 | | |
| Example 6 | | 2.7 | | | 10.0 | | |
| Example 7 | | 2.7 | | | 8.1 | | |
| Example 8 | | 2.7 | | | 8.6 | | |
| Example 9 | | 2.7 | | | 9.0 | | |
| Example 10 | | 2.7 | | | 10.0 | | |
| Example 11 | | 4.0 | | | 10.0 | | |
| Example 12 | SBA-1 | 10.0 | | | 10.0 | | |
| Example 13 | MCM- 41 | 1.8 | | | 12.0 | 140 | 72 |
| Example 14 | | 2.7 | | | | 140 | |
| Example 15 | | 2.7 | | | | 130 | |
| Example 16 | | 2.7 | | | | 120 | |
| Example 17 | SBA-1 | 10.0 | | | | 130 | |
| Example 18 | MCM-41 | 2.7 | | | | 150 | 65 |
| Example 19 | | 2.7 | | | | | 60 |
| Example 20 | | 2.7 | | | | | 55 |
| Example 21 | | 4.0 | | | | | 50 |
| Example 22 | SBA-1 | 10.0 | | | | | 55 |
| Comparative Example 1 | | | | — | | | |
| Comparative Example 2 | | | | — | | | |
| Comparative Example 3 | MCM-41 | 2.7 | 100 | TPABr | 12.2 | 150 | 72 |

TABLE 2

| | Catalyst structure | | | | | |
|---|---|---|---|---|---|---|
| | Support Zeolite-type compound | | | Catalytic material Metal fine particle | | |
| | Structure | Average inner diameter $D_F$ of channels (nm) | Long side dimension L/thickness dimension d | Type | Average particle size $D_C$ (nm) | $D_C/D_F$ |
| Example 1 | MFI type silicalite | 0.56 | 15.9 | Ni | 1.44 | 2.6 |
| Example 2 | | | 5.0 | | 2.50 | 4.5 |
| Example 3 | | | 6.2 | | 2.50 | 4.5 |
| Example 4 | | | 7.2 | | 2.50 | 4.5 |
| Example 5 | | | 10.4 | | 2.50 | 4.5 |
| Example 6 | | | 17.3 | | 2.50 | 4.5 |
| Example 7 | | | 33.0 | | 2.50 | 4.5 |
| Example 8 | | | 24.2 | | 2.50 | 4.5 |
| Example 9 | | | 21.2 | | 2.50 | 4.5 |
| Example 10 | | | 16.6 | | 2.50 | 4.5 |
| Example 11 | | | 13.3 | | 3.50 | 6.3 |
| Example 12 | | | 15.9 | | 8.00 | 14.3 |
| Example 13 | | | 15.0 | | 1.44 | 2.6 |
| Example 14 | | | 16.0 | | 2.50 | 4.5 |
| Example 15 | | | 10.0 | | 2.50 | 4.5 |
| Example 16 | | | 5.2 | | 2.50 | 4.5 |
| Example 17 | | | 11.0 | | 8.00 | 14.3 |
| Example 18 | | | 15.2 | | 1.44 | 2.6 |
| Example 19 | | | 16.0 | | 2.50 | 4.5 |

TABLE 2-continued

| | Catalyst structure | | | | | |
|---|---|---|---|---|---|---|
| | Support Zeolite-type compound | | | Catalytic material | | |
| | | Average inner diameter $D_F$ of channels (nm) | Long side dimension L/thickness dimension d | Metal fine particle | | |
| | Structure | | | Type | Average particle size $D_C$ (nm) | $D_C/D_F$ |
| Example 20 | | | 11.0 | | 2.50 | 4.5 |
| Example 21 | | | 5.3 | | 2.50 | 4.5 |
| Example 22 | | | 13.0 | | 8.00 | 14.3 |
| Comparative Example 1 | $Al_2O_3$ | — | — | Ni | — | — |
| Comparative Example 2 | $Al_2O_3$ | — | — | Ni | — | — |
| Comparative Example 3 | MFI type silicalite | 0.56 | 1.0 | Ni | 2.50 | 4.5 |

TABLE 3

| | Performance evaluation | | |
|---|---|---|---|
| | Initial catalytic activity ($CH_4$ conversion rate after 60-minute reaction) | Coking resistance (coke content after 60-minute reaction) | Comprehensive evaluation (lower one among the results of initial catalytic activity and coking resistance) |
| Example 1 | ◎ | ◎ | ◎ |
| Example 2 | Δ | ◎ | Δ |
| Example 3 | ○ | ◎ | ○ |
| Example 4 | ◎ | ◎ | ◎ |
| Example 5 | ◎ | ◎ | ◎ |
| Example 6 | ◎ | ◎ | ◎ |
| Example 7 | ◎ | ◎ | ◎ |
| Example 8 | ◎ | ◎ | ◎ |
| Example 9 | ◎ | ◎ | ◎ |
| Example 10 | ◎ | ◎ | ◎ |
| Example 11 | ◎ | ◎ | ◎ |
| Example 12 | ○ | ○ | ○ |
| Example 13 | ◎ | ◎ | ◎ |
| Example 14 | ◎ | ◎ | ◎ |
| Example 15 | ◎ | ◎ | ◎ |
| Example 16 | Δ | ◎ | Δ |
| Example 17 | ○ | ○ | ○ |
| Example 18 | ◎ | ◎ | ◎ |
| Example 19 | ◎ | ◎ | ◎ |
| Example 20 | ◎ | ◎ | ◎ |
| Example 21 | Δ | ◎ | Δ |
| Example 22 | ○ | ○ | ○ |
| Comparative Example 1 | X | Δ | X |
| Comparative Example 2 | ○ | X | X |
| Comparative Example 3 | X | ◎ | X |

Tables 1 to 3 show that the catalyst structures (Examples 1 to 22), found to hold the catalytic material inside the support in the cross-sectional observation, have higher catalytic activity for the dry reforming reaction and higher coking resistance than the catalyst structures (Comparative Examples 1 and 2) having the catalytic material only deposited on the outer surface of the support. The catalyst structure of Comparative Example 3 with the long side dimension L equal to the thickness dimension d (L/d=1.0) was attempted to be evaluated for performance using the same measurement method, but the measurement was very unstable. This may be because the density of the catalyst structure of Comparative Example 3 filled in the catalytic bed of the atmospheric pressure flow reactor should be higher than that of the examples so that some influences, such as hindrance to the entering of the raw material gas into the inside of the channels of the catalyst structure, should make the measurement very unstable.

(3) Long-Term Test for Catalytic Activity and Coking Resistance

A long-term test was carried out to evaluate the catalytic activity and the coking resistance of the catalyst structures of Examples 3 to 6, 9, and 15 to 18 and Comparative Examples 1 and 2. The atmospheric pressure flow reactor was filled with 50 mg of the catalyst structure of each of Examples 3 to 6, 9, and 15 to 18 and Comparative Examples 1 and 2. While $CO_2$ (5 ml/minute) and $CH_4$ (5 ml/minute) as raw material gases were supplied at GHSV 5,600 $h^{-1}$ to the reactor, the reactor was held at 100° C. for 10 minutes and then heated to 900° C. at 20° C./minute such that the total time of the heating at 100° C. or higher was 300 minutes. It should be noted that the total time of the heating was changed to 60 minutes for the catalyst structures of Comparative Examples 1 and 2, on which the amount of coke was higher in the evaluation of "(2) Coking Resistance" shown above. The used atmospheric pressure flow reactor was a single microreactor Rx-3050SR available from Frontier Laboratory). The product was analyzed by use of the gas chromatography (GC) and the gas chromatography-mass spectrometry (GC/MS). The gas product was analyzed by use of an analyzer TRACE 1310GC (manufactured by Thermo Fisher Scientific Inc., detector: thermal conductivity detector).

The $CH_4$ conversion rate for the catalytic activity was evaluated according to the same criteria as for "(1) Catalytic Activity" shown above, and after the 300-minute reaction, the amount of coke on the catalyst was analyzed using the same CHN elemental analysis system as used for "(2) Coking Resistance" shown above. Table 4 shows the results. Table 4 also shows the results regarding the initial catalytic activity shown in Table 3. In Table 4, the mark "*1" indicates that the amount of coke was undetectable and below the detection limit of less than 0.30 mass % of the Cliff elemental analysis system. The mark "*2" indicates that the long-term test evaluation was impossible due to the poor catalytic activity. The mark "*3" indicates that the long-term test evaluation after 300 minutes was abandoned due to a large amount (20.64 mass %) of coke already produced during the initial stage of the reaction (after 60 minutes). As is evident from Table 4, the 1 mass % Ni/Al$_2$O$_3$ catalyst structure (Comparative Example 1) had poor initial catalytic activity and had a coke content of 1.20 mass % even at a very low level of the catalytic activity. The commercially available 66 mass % Ni/Al$_2$O$_3$—SiO$_2$ catalyst structure (Comparative Example 2) was found to produce a large amount (at least 20 mass %) of coke thereon after a total heating time of 60 minutes although the initial catalytic activity was relatively high.

In contrast, the catalyst structures of Examples 3 to 6, 9, and 15 to 18 were all found to maintain good catalytic activity even after the 300-minute reaction and to produce coke in an amount below the detection limit of the analysis system, which indicates very good catalytic activity and coking resistance. It is also notable that the production of coke on the catalyst structure of each of Examples 3 to 6, 9, and 15 to 18 with high catalytic activity was kept below the detection limit even as compared to that on the catalyst structure of Comparative Example 1 with very low catalytic activity.

TABLE 4

| | CH$_4$ conversion rate after 60-minute reaction (Initial catalytic activity) | CH$_4$ conversion rate after 300-minute reaction (catalytic activity immediately before completion) | Coke content after 300-minute reaction (mass %) |
|---|---|---|---|
| Example 3 | ◎ | ◎ | Undetectable (※1) |
| Example 4 | ◎ | ◎ | Undetectable (※1) |
| Example 5 | ◎ | ◎ | Undetectable (※1) |
| Example 6 | ◎ | ◎ | Undetectable (※1) |
| Example 9 | ◎ | ◎ | Undetectable (※1) |
| Example 15 | ◎ | ◎ | Undetectable (※1) |
| Example 16 | ◎ | ◎ | Undetectable (※1) |
| Example 17 | ◎ | ◎ | Undetectable (※1) |
| Example 18 | ◎ | ◎ | Undetectable (※1) |
| Comparative Example 1 | X | —(※2) | 1.20 |
| Comparative Example 2 | ○ | —(※3) | 20.64 |

A reference example will be provided below although it cannot be directly compared to the examples. Quan Luu Manh Ha et al. reports that 0.65 mass % of coke was produced on a Ni-based catalyst used in carrying out a dry reforming reaction at a temperature of 600° C. for 480 minutes under the supply of a mixed gas of CH$_4$/CO$_2$/He (45 vol %/45 vol %/10 vol %) (Catalysts 2017, 7, 157:doi: 10.3390/catal7050157). In contrast to 0.65 mass % of coke produced in the prior art, the resulting production of coke in the examples was below the detection limit (0.30 mass %) even at a reaction temperature 100° C. higher than that an the prior art, although it is difficult no make a direct comparison between the prior art and the examples since it is impossible to provide completely the same reaction conditions as those by Quan Luu Manh Ha et al. due to the differences in equipment. In general, it is well known that, during the dry reforming reaction, as the catalytic activity increases with increasing temperature, the production of coke increases.

In fact, Comparative Examples 1 and 2 with different Ni contents show that, as the Ni content increases, the catalytic activity improves from (x) to (o), but the production of coke remarkably increases accordingly (see Table 4). In contrast, the examples according to the present invention successfully kept the production of coke low in spite of the reaction conditions which are more likely to cause coking than those using the catalyst reported by Quan Lou Manh Ha et al. This also demonstrates that the catalyst structures of the examples according to the present invention have both higher activity and higher coking resistance than those of the prior art.

EXPLANATION OF REFERENCE NUMERALS

1, 2: Catalyst structure
10: Support
10a: Outer surface
11: Channel
11a: Pore
12: Enlarged pore portion
20: Catalytic material
30: Catalytic material

The invention claimed is:

1. A synthesis gas production catalyst structure, comprising:
   a support that has a porous structure and comprises a zeolite-type compound; and
   a catalytic material present in the support, wherein
   the support has channels communicating with one another,
   the channels have any one of a one-dimensional pore, a two-dimensional pore, a three-dimensional pore of a framework structure of the zeolite-type compound, and an enlarged pore portion which is not defined by the framework structure of the zeolite-type compound and has a diameter greater than any one of the one-dimensional pore, the two-dimensional pore, and the three-dimensional pore,
   the enlarged pore portion has a greater diameter than the catalytic material,
   the catalytic material has a diameter greater than any one of the one-dimensional pore, the two-dimensional pore and the three-dimensional pore,
   the zeolite-type compound has a framework structure that is selected from the group consisting of FAU type, MTW type, MFI type, FER type, LTA type, MWW type, MOR type, LTL type, and BEA type,
   the catalytic material includes metal oxide nanoparticles or metal nanoparticles,
   the support has an L/d ratio of a long side dimension L to a thickness dimension d of 5.0 or more and 35.0 or less,
   the catalytic material is present at least in the channels of the support, and
   the synthesis gas production catalyst structure is obtained by:
      impregnating a precursor material (A), which is a regular mesoporous material, with a metal-containing solution to form a precursor material (B), the precursor material (A) being a compound having a Si—O skeleton having pores with a pore size of 1.0 nm or more and 13.0 nm or less uniformly and regularly developed one-dimensionally, two-dimensionally, or three-dimensionally,
      calcinating the precursor material (B) to form a precursor material (C),
      preparing a mixture solution of the precursor material (C) and a structure-directing agent, and
      subjecting the mixture solution to a hydrothermal treatment to obtain the synthesis gas production catalyst structure.

2. The synthesis gas production catalyst structure according to claim 1, wherein the L/d ratio of the supports is 7.0 or more and 25.0 or less.

3. The synthesis gas production catalyst structure according to claim 1, wherein the catalytic material has an average particle size larger than an average inner diameter of the channels.

4. The synthesis gas production catalyst structure according to claim 1, wherein
the catalytic material is present at least in the enlarged pore portion.

5. The synthesis gas production catalyst structure according to claim 4, wherein the enlarged pore portion connects a plurality of pores constituting any one of the one-dimensional pore, the two-dimensional pore, and the three-dimensional pore.

6. The synthesis gas production catalyst structure according to claim 4, wherein the catalytic material has an average particle size equal to or smaller than an inner diameter of the enlarged pore portion.

7. The synthesis gas production catalyst structure according to claim 1, wherein the catalytic material is in the form of a metal fine particle.

8. The synthesis gas production catalyst structure according to claim 7, wherein a ratio ($D_C/D_F$) of an average particle size $D_C$ of the metal fine particle to an average inner diameter $D_F$ of the channels is 0.05 or more and 130.0 or less.

9. The synthesis gas production catalyst structure according to claim 7, wherein the metal fine particle is a fine particle comprising at least one metal selected from the group consisting of iron (Fe), cobalt (Co), and nickel (Ni).

10. The synthesis gas production catalyst structure according to claim 7, wherein the metal fine particle is a fine particle comprising nickel (Ni).

11. The synthesis gas production catalyst structure according to claim 1, further comprising at least one additional catalytic material held on an outer surface of the support.

12. The synthesis gas production catalyst structure according to claim 11, wherein the content of at least one catalytic material present in the support is higher than the content of the at least one additional catalytic material held on the outer surface of the support.

13. The synthesis gas production catalyst structure according to claim 1, wherein the zeolite-type compound is a silicate compound.

14. The synthesis gas production catalyst structure according to claim 1, wherein:
a $CH_4$ conversion rate at 700° C. is 20% or more when a dry reforming reaction is performed by charging the synthesis gas production catalyst structure in an atmospheric pressure flow reactor, supplying a raw material gas with a $CO_2/CH_4$ ratio (volume ratio) of 1:1 at a gas hourly space velocity (GHSV) of 5600 $h^{-1}$ to the reactor, and heating under conditions that the synthesis gas production catalyst structure is heated at 100° C. for 10 minutes and then is heated to 900° C. at 20° C./minute and a total time of heating at 100° C. or higher is 60 minutes, and
a coke content of the synthesis gas production catalyst structure measured by CHN analysis after the dry reforming reaction with respect to a total mass of the synthesis gas production catalyst structure is less than 5.0 mass %.

15. The synthesis gas production catalyst structure according to claim 14, wherein the $CH_4$ conversion rate at 700° C. of the dry reforming reaction is 60% or more.

16. The synthesis gas production catalyst structure according to claim 14, wherein a coke content of the synthesis gas production catalyst structure measured by CHN analysis after the dry reforming reaction with respect to a total mass of the synthesis gas production catalyst structure is less than 0.3 mass %.

17. A synthesis gas production catalyst structure, comprising:
a support that has a porous structure and comprises a zeolite-type compound; and
a catalytic material present in the support, wherein
the support has channels communicating with one another,
the channels have any one of a one-dimensional pore, a two-dimensional pore, a three-dimensional pore of a framework structure of the zeolite-type compound, and an enlarged pore portion which is not defined by the framework structure of the zeolite-type compound and has a diameter greater than any one of the one-dimensional pore, the two-dimensional pore, and the three-dimensional pore,
the enlarged pore portion has a greater diameter than the catalytic material,
the catalytic material has a diameter greater than any one of the one-dimensional pore, the two-dimensional pore and the three-dimensional pore,
the zeolite-type compound has a framework structure that is selected from the group consisting of FAU type, MTW type, MFI type, FER type, LTA type, MWW type, MOR type, LTL type, and BEA type,
the catalytic material includes metal oxide nanoparticles or metal particles,
the support has an L/d ratio of a long side dimension L to a thickness dimension d of 5.0 or more and 35.0 or less,
the catalytic material is present at least in the channels of the support and has an average particle size of 1.00 nm or more and 13.00 nm or less, and
the synthesis gas production catalyst structure is obtained by:
impregnating a precursor material (A), which is a regular mesoporous material, with a metal-containing solution to form a precursor material (B), the precursor material (A) being a compound having a Si—O skeleton having pores with a pore size of 1.0 nm or more and 13.0 nm or less uniformly and regularly developed one-dimensionally, two-dimensionally, or three-dimensionally,
calcinating the precursor material (B) to form a precursor material (C),
preparing a mixture solution of the precursor material (C) and a structure-directing agent, and
subjecting the mixture solution to a hydrothermal treatment to obtain the synthesis gas production catalyst structure.

\* \* \* \* \*